United States Patent
Noguchi

(10) Patent No.: US 10,133,434 B2
(45) Date of Patent: Nov. 20, 2018

(54) DETECTION DEVICE, DISPLAY DEVICE, AND ELECTRONIC APPARATUS

(71) Applicant: Japan Display Inc., Tokyo (JP)

(72) Inventor: Koji Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/359,081

(22) Filed: Nov. 22, 2016

(65) Prior Publication Data

US 2017/0262093 A1 Sep. 14, 2017

(30) Foreign Application Priority Data

Mar. 9, 2016 (JP) .................................. 2016-045845

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04107* (2013.01); *G06F 2203/04112* (2013.01)

(58) Field of Classification Search
CPC ............................... G06F 3/044; G06F 3/0412
See application file for complete search history.

(56) References Cited

U.S. PATENT DOCUMENTS

| 2008/0007539 A1* | 1/2008 | Hotelling | G06F 3/044 345/173 |
| 2012/0069257 A1* | 3/2012 | Oh | G02F 1/13338 349/42 |
| 2014/0152621 A1* | 6/2014 | Okayama | G06F 3/0416 345/174 |
| 2014/0198268 A1* | 7/2014 | Sugita | G06F 3/044 349/12 |
| 2015/0193082 A1* | 7/2015 | Ludden | G06F 3/044 345/174 |
| 2017/0090637 A1* | 3/2017 | Yoon | G06F 3/0414 |

FOREIGN PATENT DOCUMENTS

JP 2000-066837 A 3/2000

* cited by examiner

*Primary Examiner* — Kevin M Nguyen
(74) *Attorney, Agent, or Firm* — K&L Gates LLP

(57) ABSTRACT

A detection device includes: a substrate having a first surface and a second surface on the opposite side of the first surface; a first electrode that extends in a first direction in a plane parallel to the first surface of the substrate, and that is supplied with a first drive signal for detecting an object in contact with or in proximity to the first surface side of the substrate; a plurality of wires that face the first electrode and are arranged in the first direction, and that is supplied with a direct-current voltage signal; and a conductor that is provided on the second surface side of the substrate, and that generates an electrostatic capacitor between the conductor and the first electrode.

17 Claims, 33 Drawing Sheets

FIG.24

(TABLE 1)

|  | PRESSED POSITION | | |
| --- | --- | --- | --- |
|  | COML1 | COML2 | COML3 |
| DETECTION 1 (Vdet2A) | Low | Low | High |
| DETECTION 2 (Vdet2B) | High | Low | Low |
| DETECTION 3 (Vdet2C) | Low | High | High |
| CALCULATION (Vdet2C − Vdet2A) | Low | High | Low |

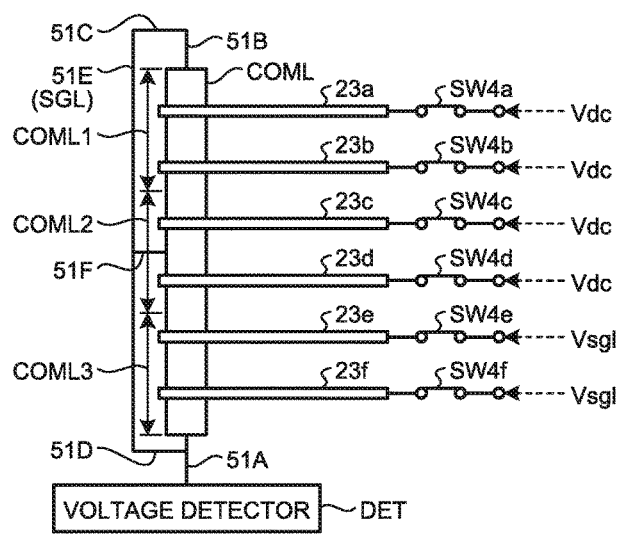
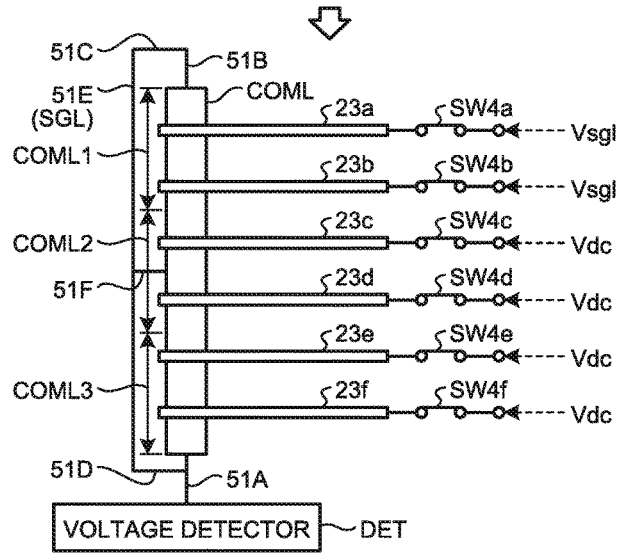
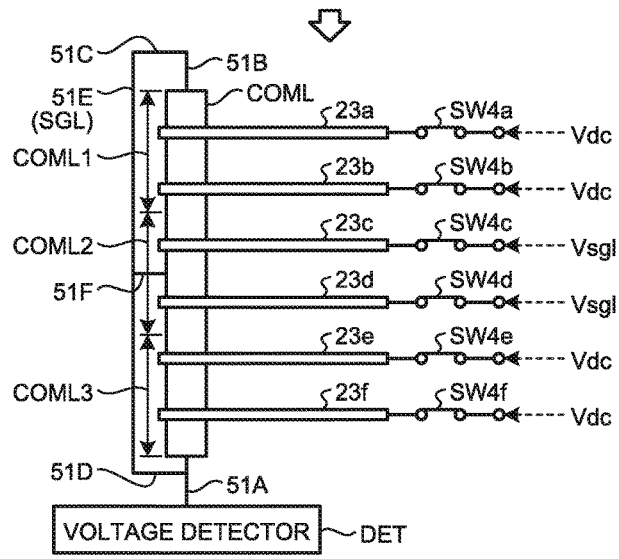

FIG.34

(TABLE 2)

|  | PRESSED POSITION | | |
| --- | --- | --- | --- |
|  | COML1 | COML2 | COML3 |
| DETECTION 1 (Vdet2A) | Low | Low | High |
| DETECTION 2 (Vdet2B) | High | Low | Low |
| DETECTION 3 (Vdet2C) | Low | High | Low |

FIG.37

(TABLE 3)

|  | PRESSED POSITION | | |
| --- | --- | --- | --- |
|  | COML1 | COML2 | COML3 |
| DETECTION 1 (Vdet2A) | Low | Low | High |
| DETECTION 2 (Vdet2B) | Low | High | High |
| DETECTION 3 (Vdet2C) | High | High | High |
| CALCULATION 1 (Vdet2B - Vdet2A) | Low | High | Low |
| CALCULATION 2 (Vdet2C - Vdet2B) | High | Low | Low |

DETECTION DEVICE, DISPLAY DEVICE, AND ELECTRONIC APPARATUS

CROSS-REFERENCE TO RELATED APPLICATIONS

This application claims priority from Japanese Application No. 2016-045845, filed on Mar. 9, 2016, the contents of which are incorporated by reference herein in its entirety.

BACKGROUND

1. Technical Field

The present invention relates to a detection device, a display device, and an electronic apparatus.

2. Description of the Related Art

In recent years, attention has been attracted to a touch detection device that is capable of detecting an external proximate object, and is commonly called a touch panel. The touch panel is mounted on, or integrated with, a display device, such as a liquid crystal display device, and is used as a display device with a touch detection function. A display device provided with a capacitance touch sensor is known as such a display device with a touch detection function. A display device is also known, detecting force when an input surface thereof is pressed by a finger or the like, and performing various functions according to the level of the force.

Japanese Patent Application Laid-open Publication No. 2000-66837 (JP-A-2000-66837) describes a force detecting digitizer that includes liquid crystal display cells, and gate lines and drain lines provided in mutually intersecting directions. The force detecting digitizer disclosed in JP-A-2000-66837 detects force applied to a liquid crystal display panel based on capacitance changes of the liquid crystal display cells provided at respective intersections of the gate lines and the drain lines.

In the case of JP-A-2000-66837, detection of correct input positions and correct levels of the force may be difficult if the inputs are applied to a plurality of places on the liquid crystal display panel. If the force is detected by detection electrodes or drive electrodes of a touch panel, the resolution of force detection is restricted by shapes and sizes of the electrodes, so that the detection accuracy of the force may be lowered.

For the foregoing reasons, there is a need for providing a detection device, a display device, and an electronic apparatus that can accurately detect force.

SUMMARY

According to an aspect, a detection device includes a substrate having a first surface and a second surface on the opposite side of the first surface, a first electrode that extends in a first direction in a plane parallel to the first surface of the substrate, and that is configured to be supplied with a first drive signal for detecting an object in contact with or in proximity to the first surface side of the substrate, a plurality of wires that face the first electrode and are arranged in the first direction, and that is configured to be supplied with a direct-current voltage signal, and a conductor that is provided on the second surface side of the substrate, and that is configured to generate an electrostatic capacitor between the conductor and the first electrode.

According to another aspect, a display device includes the detection device described above, a plurality of pixel electrodes arranged in a matrix and facing the first electrode, and a display function layer configured to perform an image display function in a display area.

According to another aspect, an electronic apparatus includes the detection device described above, and a housing incorporating the detection device. The housing includes the conductor.

According to another aspect, an electronic apparatus includes the display device described above, and a housing incorporating the display device. The housing includes the conductor.

BRIEF DESCRIPTION OF THE DRAWINGS

FIG. 24 is a table illustrating relations between a pressed position and output signal levels obtained as respective detection results and calculation results;

FIGS. 32A to 32C are explanatory diagrams for explaining operation examples of the force detection by the display device with a touch detection function according to the third embodiment;

FIG. 34 is a table illustrating relations between the pressed position and the output signal levels obtained as respective detection results;

FIG. 37 is a table illustrating relations between the pressed position and the output signal levels obtained as respective detection results and calculation results;

DETAILED DESCRIPTION

Figure 1:
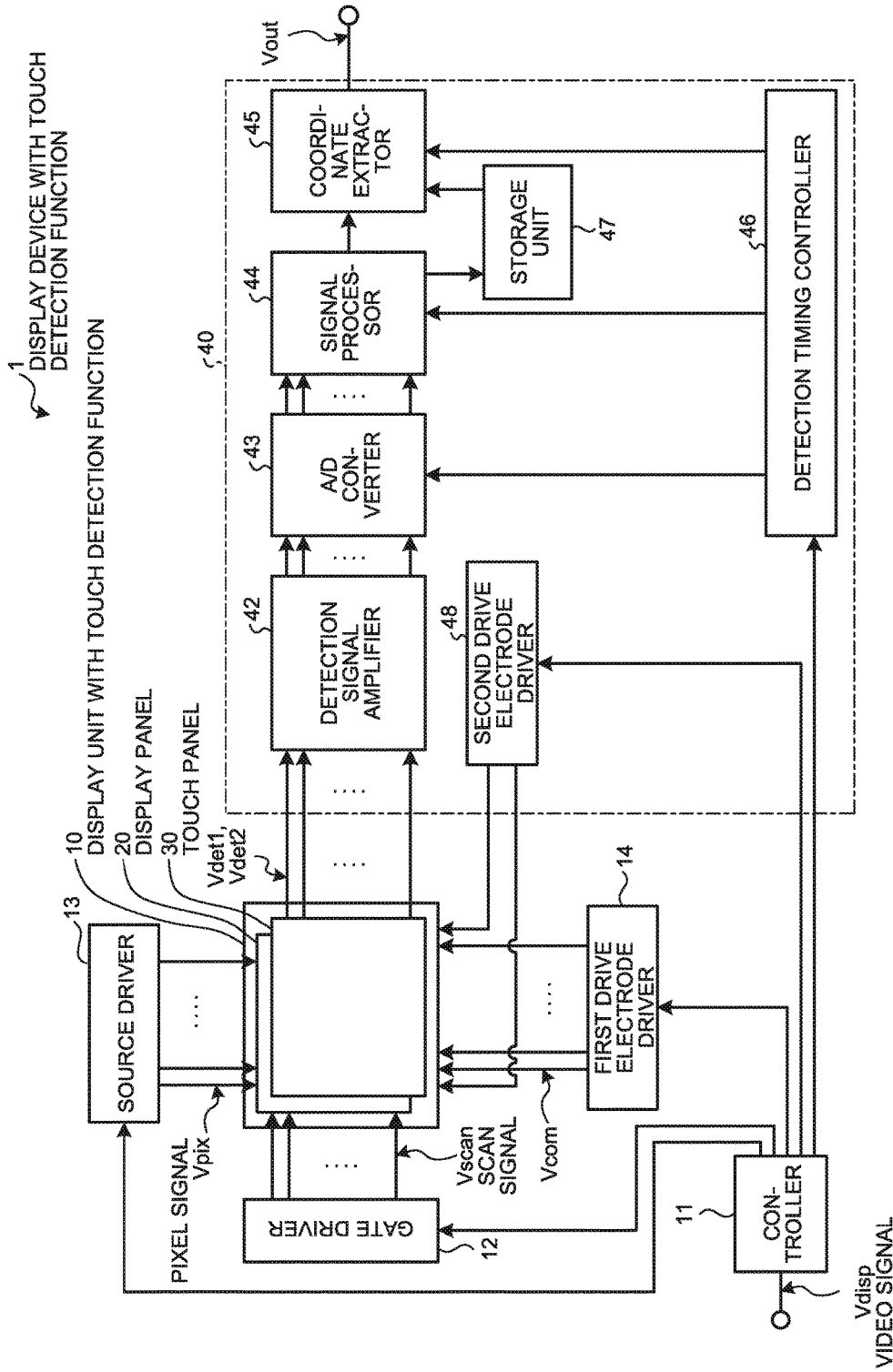
FIG. 1 is a block diagram illustrating a configuration example of a display device with a touch detection function according to a first embodiment of the present invention.

Embodiments for carrying out the present invention will be described in detail with reference to the drawings. The present invention will not be limited by the description of the embodiments given below. Components described below include those easily conceivable by those skilled in the art, and those substantially the same. Moreover, the components described below can be combined as appropriate. The disclosure is merely an example, and the present invention naturally encompasses an appropriate modification maintaining the gist of the invention, which is easily conceivable by those skilled in the art. To further clarify the description, a width, a thickness, a shape, and the like of each component may be schematically illustrated in the drawings as compared with an actual aspect. However, this is merely an example, and interpretation of the invention is not limited thereto. The same element as that described in the drawing that has already been discussed is denoted by the same reference numeral through the description and the drawings, and detailed description thereof will not be repeated in some cases where appropriate.

First Embodiment

FIG. 1 is a block diagram illustrating a configuration example of a display device with a touch detection function according to a first embodiment. As illustrated in FIG. 1, the display device with a touch detection function 1 includes a display unit with a touch detection function 10, a controller 11, a gate driver 12, a source driver 13, a first drive electrode driver 14, and a detector 40. The display device with a touch detection function 1 is a display device in which the display unit with a touch detection function 10 incorporates a touch detection function. The display unit with a touch detection function 10 is a device configured by integrating a display panel 20 using liquid crystal display elements as display elements and a touch panel 30 serving as a detection device for detecting a touch input. The display unit with a touch detection function 10 may be what is called an on-cell device configured by mounting the touch panel 30 on the display panel 20. The display panel 20 may be an organic electroluminescent (EL) display panel.

The display panel 20 is an element that performs display by sequentially scanning one horizontal line at a time according to a scan signal Vscan supplied from the gate driver 12, as will be described later. The controller 11 is a circuit that supplies a control signal to each of the gate driver 12, the source driver 13, the first drive electrode driver 14, and the detector 40 based on an externally supplied video signal Vdisp, and thus controls these drivers and the detector so as to operate them in synchronization with one another.

The gate driver 12 has a function to sequentially select one horizontal line to be driven to perform display of the display unit with a touch detection function 10, based on the control signal supplied from the controller 11.

The source driver 13 is a circuit that supplies a pixel signal Vpix to each sub-pixel SPix (described later) of the display unit with a touch detection function 10, based on the control signal supplied from the controller 11.

The first drive electrode driver 14 is a circuit that supplies a first drive signal Vcom to a drive electrode COML (described later) of the display unit with a touch detection function 10, based on the control signal supplied from the controller 11.

The touch panel 30 operates based on the basic principle of capacitance touch detection, and performs a touch detection operation using a mutual capacitance method to detect contact or proximity of an external conductor with a display area. The touch panel 30 may perform the touch detection operation using a self-capacitance method. The touch panel 30 performs a force detection operation using the self-capacitance method.

The detector 40 is a circuit that detects whether the touch panel 30 is touched, based on the control signal supplied from the controller 11 and a first detection signal Vdet1 supplied from the touch panel 30. When the touch panel 30 is touched, the detector 40 obtains, for example, coordinates of the touch input. The detector 40 includes a detection signal amplifier 42, an analog-to-digital (A/D) converter 43, a signal processor 44, a coordinate extractor 45, a detection timing controller 46, and a storage unit 47. The detection timing controller 46 controls the A/D converter 43, the signal processor 44, and the coordinate extractor 45 so as to operate them in synchronization with one another, based on the control signal supplied from the controller 11.

The detector 40 also includes a second drive electrode driver 48. The second drive electrode driver 48 is a circuit that supplies a direct-current (DC) voltage signal Vdc or a guard signal Vsg1 to wires 23 (described later) when force applied to the display unit with a touch detection function 10 is detected. The detector 40 detects the force applied to the display unit with a touch detection function 10 based on a second detection signal Vdet2 supplied from the touch panel 30.

Figure 2:
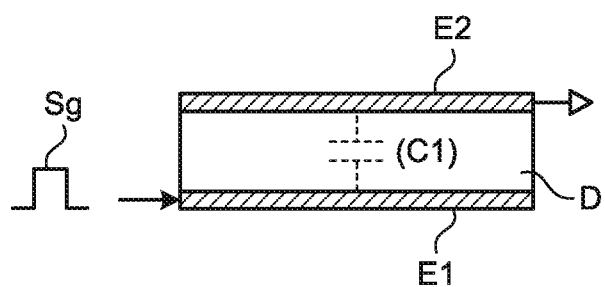
FIG. 2 is an explanatory diagram for explaining the basic principle of mutual capacitance touch detection, the diagram illustrating a state where a finger is neither in contact with nor in proximity to a detection electrode.
Figure 3:
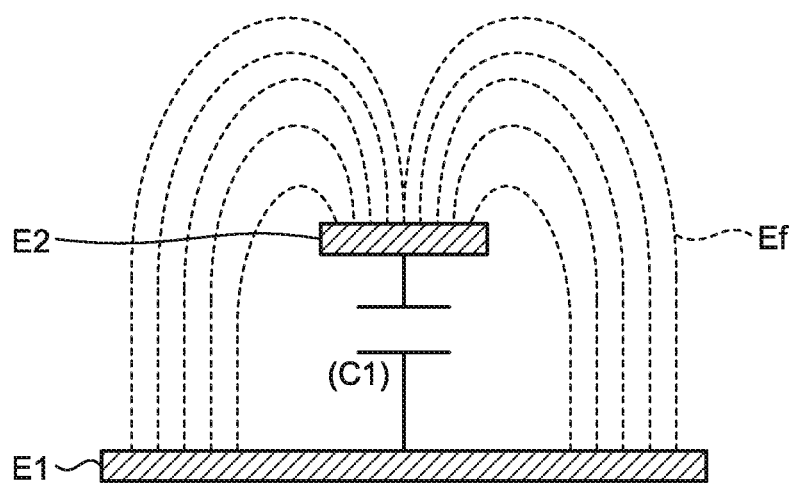
FIG. 3 is explanatory diagram illustrating an example of a fringing electric field in the state illustrated in FIG. 2 where the finger is neither in contact with nor in proximity to the detection electrode.
Figure 4:
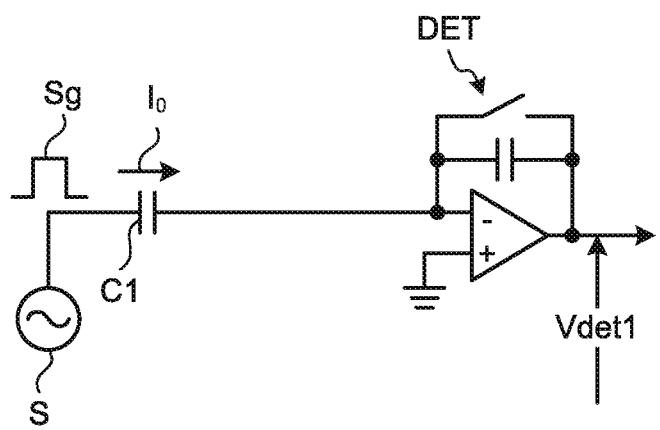
FIG. 4 is an explanatory diagram illustrating an example of an equivalent circuit in the state illustrated in FIG. 2 where the finger is neither in contact with nor in proximity to the detection electrode.
Figure 5:
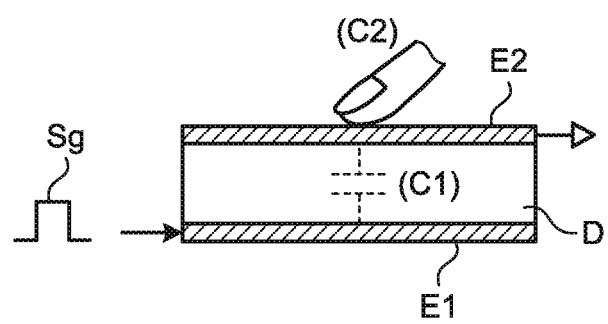
FIG. 5 is an explanatory diagram for explaining the basic principle of the mutual capacitance touch detection, the diagram illustrating a state where the finger is in contact with or in proximity to the detection electrode.
Figure 6:
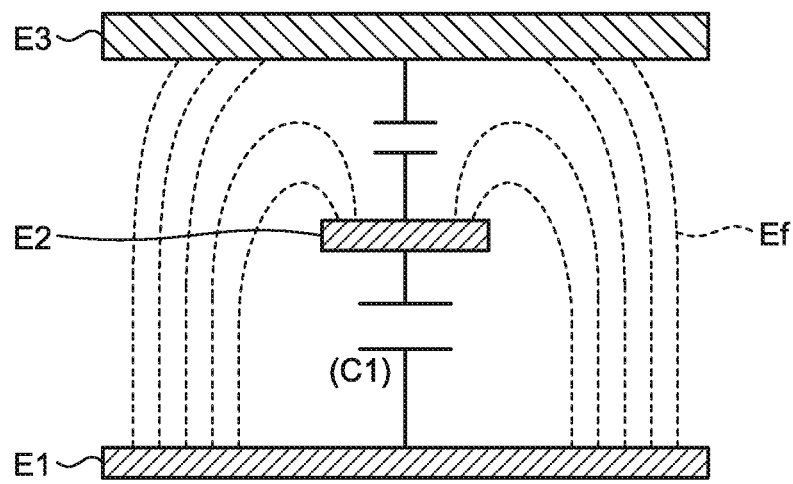
FIG. 6 is explanatory diagram illustrating an example of the fringing electric field in the state illustrated in FIG. 5 where the finger is in contact with or in proximity to the detection electrode.
Figure 7:
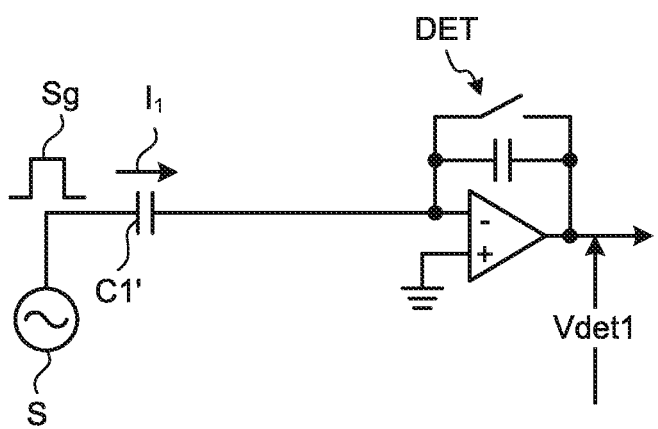
FIG. 7 is an explanatory diagram illustrating an example of the equivalent circuit in the state illustrated in FIG. 5 where the finger is in contact with or in proximity to the detection electrode.
Figure 8:
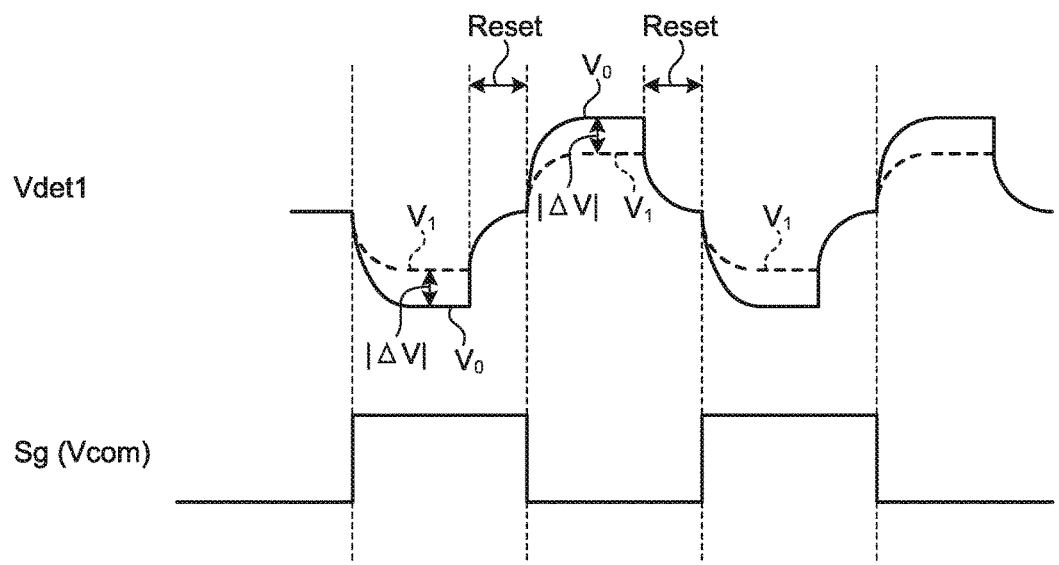
FIG. 8 is a diagram illustrating an example of waveforms of a drive signal and a first detection signal of the mutual capacitance touch detection.

As described above, the touch panel 30 operates based on the basic principle of the capacitance touch detection. The following describes the basic principle of the touch detection using the mutual capacitance method performed by the display device with a touch detection function 1 of the present embodiment, with reference to FIGS. 2 to 8. FIG. 2 is an explanatory diagram for explaining the basic principle of the mutual capacitance touch detection, the diagram illustrating a state where a finger is neither in contact with nor in proximity to a detection electrode. FIG. 3 is explanatory diagram illustrating an example of a fringing electric field in the state illustrated in FIG. 2 where the finger is neither in contact with nor in proximity to the detection electrode. FIG. 4 is an explanatory diagram illustrating an example of an equivalent circuit in the state illustrated in FIG. 2 where the finger is neither in contact with nor in proximity to the detection electrode. FIG. 5 is an explanatory diagram for explaining the basic principle of the mutual capacitance touch detection, the diagram illustrating a state where the finger is in contact with or in proximity to the detection electrode. FIG. 6 is explanatory diagram illustrating an example of the fringing electric field in the state illustrated in FIG. 5 where the finger is in contact with or in proximity to the detection electrode. FIG. 7 is an explanatory diagram illustrating an example of the equivalent circuit in the state illustrated in FIG. 5 where the finger is in contact with or in proximity to the detection electrode. FIG. 8 is a diagram illustrating an example of waveforms of the drive signal and the first detection signal. Although the following describes the case where the finger is in contact with or in proximity to the detection electrode, an object being in contact with or in proximity to the detection electrode is not limited to the finger, but, for example, an object including a conductor, such as a stylus pen may be in contact with or in proximity to the detection electrode.

For example, as illustrated in FIG. 2, a capacitive element C1 includes a pair of electrodes, that is, a drive electrode E1 and a detection electrode E2 that are arranged opposite to each other with a dielectric material D interposed therebetween. In the capacitive element C1, lines of electric force (not illustrated) are generated between opposite surfaces of the drive electrode E1 and the detection electrode E2, and in addition, as illustrated in FIG. 3, fringe portions of lines of electric force Ef that extend from ends of the drive electrode E1 toward the upper surface of the detection electrode E2 are generated. As illustrated in FIG. 4, the capacitive element C1 is coupled, at one end thereof, to an alternating-current signal source (drive signal source) S, and coupled, at the other end thereof, to a voltage detector DET. The voltage detector DET is, for example, an integration circuit included in the detection signal amplifier 42 illustrated in FIG. 1.

Applying an alternating-current rectangular wave Sg having a predetermined frequency (for example, approximately several kHz to several hundred kHz) from the alternating-current signal source S to the drive electrode E1 (one end of the capacitive element C1) causes an output waveform (first detection signal Vdet1) illustrated in FIG. 8 to occur through the voltage detector DET coupled to the detection electrode E2 side (the other end of the capacitive element C1). The alternating-current rectangular wave Sg corresponds to the first drive signal Vcom supplied from the first drive electrode driver 14.

In the state (non-contact state) where the finger is neither in contact with nor in proximity to the detection electrode, a current $I_0$ corresponding to the capacitance value of the capacitive element C1 flows in association with charge and discharge of the capacitive element C1, as illustrated in FIG. 4. The voltage detector DET illustrated in FIG. 4 converts a variation in the current $I_0$ corresponding to the alternating-current rectangular wave Sg into a variation in voltage (waveform $V_0$ of a solid line (refer to FIG. 8)).

In the state (contact state) where the finger is in contact with or in proximity to the detection electrode, an electrostatic capacitor C2 generated by the finger is in contact with or in proximity to the detection electrode E2, as illustrated in FIG. 5. This causes a conductor E3 (finger) to shield the fringe portions of the lines of electric force Ef located between the drive electrode E1 and the detection electrode E2, as illustrated in FIG. 6. This, in turn, causes the capacitive element C1 to act as a capacitive element C having a smaller capacitance value than that of the non-contact state, as illustrated in FIG. 7. Referring to the equivalent circuit illustrated in FIG. 7, a current $I_1$ flows in the capacitive element C1. As illustrated in FIG. 8, the voltage detector DET converts a variation in the current L corresponding to the alternating-current rectangular wave Sg into a variation in voltage (waveform $V_1$ of a dotted line). In this case, the waveform $V_1$ has a smaller amplitude than the above-mentioned waveform $V_0$. As a result, an absolute value $|\Delta V|$ of a voltage difference between the waveform $V_0$ and the waveform $V_1$ changes according to an influence of the conductor E3, such as the finger, coming into contact with or proximity to the detection electrode from the outside. To accurately detect the absolute value $|\Delta V|$ of the voltage difference between the waveform $V_0$ and the waveform $V_1$, the voltage detector DET preferably performs an operation including a period RESET during which the charge or discharge of the capacitor is reset by switching in the circuit in accordance with the frequency of the alternating-current rectangular wave Sg.

The touch panel 30 illustrated in FIG. 1 is configured to perform the touch detection using the mutual capacitance method by sequentially scanning one detection block at a time according to the first drive signal Vcom supplied from the first drive electrode driver 14.

The touch panel 30 is configured to output the first detection signal Vdet1 from a plurality of detection electrodes TDL (described later) through the voltage detector DET illustrated in FIG. 4 or 7 on a detection-block-by-detection-block basis. The first detection signal Vdet1 is supplied to the detection signal amplifier 42 of the detector 40.

The detection signal amplifier 42 amplifies the first detection signal Vdet1 supplied from the touch panel 30. The detection signal amplifier 42 may include an analog low-pass filter (LPF), that is, an analog filter passing low-frequency components that removes high-frequency components (noise components) from the first detection signal Vdet1, and outputs the result.

The A/D converter 43 samples each analog signal output from the detection signal amplifier 42 at intervals synchronized with the first drive signal Vcom, and convert the sampled analog signal into a digital signal.

The signal processor 44 includes a digital filter that reduces frequency components (noise components) included in the output signal of the A/D converter 43 other than that of the frequency at which the first drive signal Vcom has been sampled. The signal processor 44 is a logic circuit that detects, based on the output signal of the A/D converter 43, whether the touch panel 30 is touched. The signal processor 44 performs processing to extract only a difference in detection signal caused by the finger. This signal of difference caused by the finger is obtained as the absolute value $|\Delta V|$ of the difference between the waveform $V_0$ and the waveform $V_1$ described above. The signal processor 44 may perform a calculation of averaging the absolute values $|\Delta V|$ for one detection block to obtain the average value of the absolute values $|\Delta V|$. This allows the signal processor 44 to reduce the influence of the noise. The signal processor 44 compares the detected signal of difference caused by the finger with a predetermined threshold voltage, and, if the signal of difference is lower than the threshold voltage, the signal processor 44 determines that the state is the non-contact state of the external proximate object. The signal processor 44 compares the detected signal of difference caused by the finger with the predetermined threshold voltage, and, if the signal of difference is equal to or higher than the threshold voltage, the signal processor 44 determines that the state is the contact state of the external proximate object. The detector 40 can perform the touch detection in this manner.

The coordinate extractor 45 is a logic circuit that obtains touch panel coordinates of a touch when the touch is detected by the signal processor 44. The coordinate extractor 45 outputs the touch panel coordinates as a detection signal output Vout. As described above, the display device with a touch detection function 1 of the present embodiment can detect the touch panel coordinates of a position of contact or proximity of the conductor, such as the finger, based on the basic principle of the touch detection using the mutual capacitance method.

Figure 9:
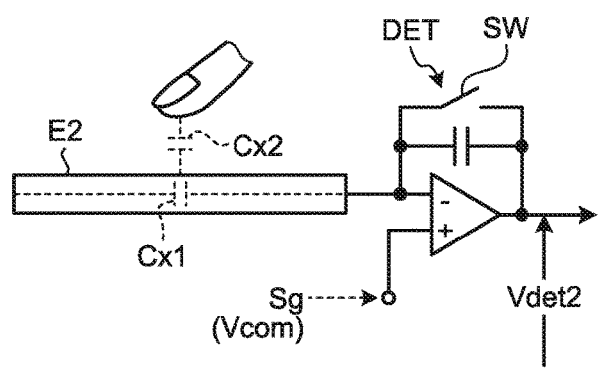
FIG. 9 is an explanatory diagram illustrating an example of an equivalent circuit for self-capacitance touch detection.
Figure 10:
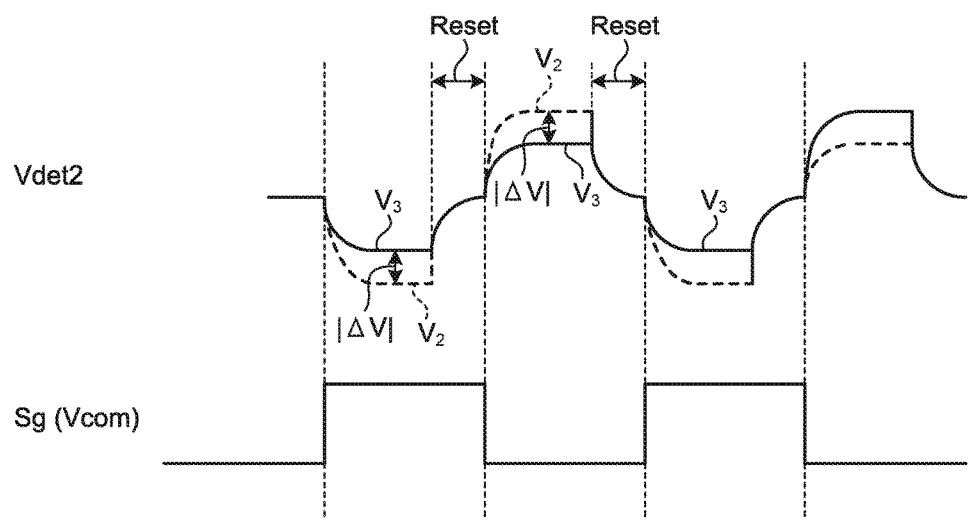
FIG. 10 is a diagram illustrating an example of waveforms of the drive signal and a second detection signal of the self-capacitance touch detection.

The following describes the basic principle of the touch detection using the self-capacitance method, with reference to FIGS. 9 and 10. FIG. 9 is an explanatory diagram illustrating an example of an equivalent circuit for the self-capacitance touch detection. FIG. 10 is a diagram illustrating an example of waveforms of the drive signal and the second detection signal of the self-capacitance touch detection.

As illustrated in FIG. 9, the voltage detector DET is coupled to the detection electrode E2. The voltage detector DET is a detection circuit including an imaginarily short-circuited operational amplifier. When the alternating-current rectangular wave Sg having the predetermined frequency (such as approximately several kHz to several hundred kHz) is applied to a non-inverting input part (+), the alternating-current rectangular wave Sg having the same potential is applied to the detection electrode E2.

In the state (non-contact state) where the conductor, such as the finger, is neither in contact with nor in proximity to the detection electrode, a current corresponding to a capacitance Cx1 possessed by the detection electrode E2 flows. The voltage detector DET converts a variation in the current corresponding to the alternating-current rectangular wave Sg into a variation in voltage (waveform $V_3$ of a solid line (refer to FIG. 10)). In the state (contact state) where the conductor, such as the finger, is in contact with or in proximity to the detection electrode, a capacitance Cx2 generated by the finger proximate to the detection electrode E2 is added to the capacitance Cx1 possessed by the detection electrode E2, and a current corresponding to a capacitance (Cx1+Cx2) increased from the capacitance of the non-contact state flows. The voltage detector DET converts the variation in the current corresponding to the alternating-current rectangular wave Sg into a variation in voltage (waveform $V_2$ of a dotted line (refer to FIG. 10)). In this case, the waveform $V_2$ has a larger amplitude than the waveform $V_3$ described above. As a result, the absolute value $|\Delta V|$ of a voltage difference between the waveform $V_2$ and the waveform $V_3$ changes according to the influence of the conductor, such as the finger, coming into contact with or proximity to the detection electrode from the outside. A switch SW is placed in the ON (open) state when the touch detection is performed, and is placed in the OFF (closed) state to perform a reset operation of the voltage detector DET when the touch detection is not performed.

The detection signal amplifier 42 amplifies the second detection signal Vdet2 supplied from the touch panel 30. The A/D converter 43 samples each analog signal output from the detection signal amplifier 42, and converts the sampled analog signal into a digital signal. The signal processor 44 calculates the absolute value $|\Delta V|$ of the difference between the waveform $V_2$ and the waveform $V_3$ based on the signal supplied from the A/D converter 43. The signal processor 44 compares the detected signal of difference (absolute value $|\Delta V|$) caused by the finger with the predetermined threshold voltage, and, if the signal of difference is lower than the threshold voltage, the signal processor 44 determines that the state is the non-contact state of the external proximate object. The signal processor 44 compares the detected signal of difference (absolute value $|\Delta V|$) caused by the finger with the predetermined threshold voltage, and, if the signal of difference is equal to or higher than the threshold voltage, the signal processor 44 determines that the state is the contact state of the external proximate object. The coordinate extractor 45 calculates the touch panel coordinates, and outputs the results as the detection signal output Vout. In this manner, the detector 40 can perform the touch detection based on the basic principle of the self-capacitance touch detection.

The voltage detector DET may be used to perform both the mutual capacitance touch detection and the self-capacitance touch detection. In this case, switching is made such that the non-inverting input part (+) is supplied with a reference voltage having a fixed potential when the mutual capacitance touch detection is performed, and the non-inverting input part (+) is supplied with the alternating-current rectangular wave Sg (first drive signal Vcom) when the self-capacitance touch detection is performed.

The above has described the detection of the external proximate object when the finger is in contact with or in proximity to the detection electrode, using FIGS. 9 and 10. The force applied to the input surface can be detected based on the detection principle of the self-capacitance method described above, by providing a conductor facing the detection electrode E2. In this case, the distance between the detection electrode E2 and the conductor changes with the force applied to the input surface of the display unit with a touch detection function 10, and the capacitance generated between the detection electrode E2 and the conductor changes. The touch panel 30 outputs the second detection signal Vdet2 corresponding to this capacitance change to the detection signal amplifier 42.

The detection signal amplifier 42, the A/D converter 43, and the signal processor 44 perform the signal processing described above to calculate the absolute value |ΔV| of the difference between the waveform $V_2$ and the waveform $V_3$. The distance between the detection electrode E2 and the conductor is obtained based on the absolute value |ΔV|. Thereby, the force applied to the input surface is calculated. The information on the force calculated by the signal processor 44 is temporarily stored in the storage unit 47. The storage unit 47 may be, for example, a random access memory (RAM), a read-only memory (ROM), or a register circuit. The coordinate extractor 45 receives a plurality of pieces of such information on the force from the storage unit 47, and calculates the force on the input position from a distribution of the force applied to the input surface and the touch panel coordinates obtained by the touch detection. The coordinate extractor 45 then outputs the information on the force as an output signal.

Figure 11:
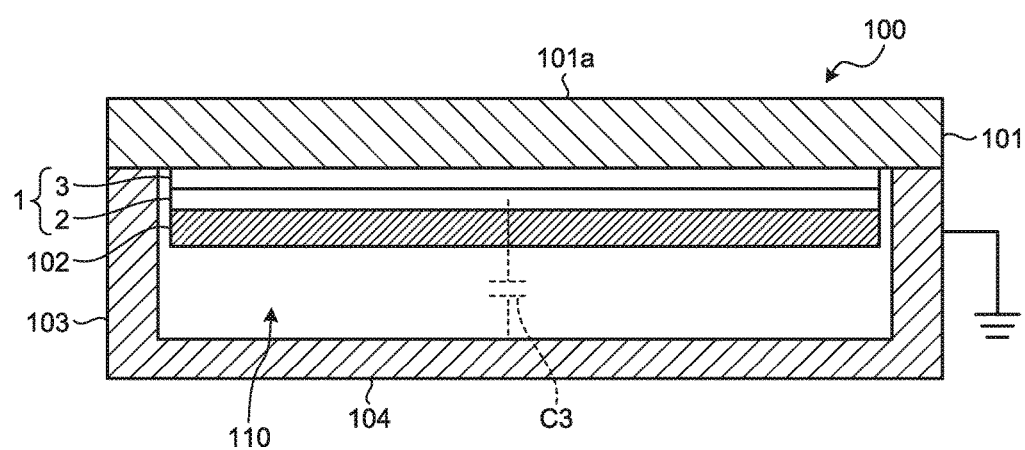
FIG. 11 is a sectional view illustrating a schematic sectional structure of an electronic apparatus including the display device with a touch detection function.

FIG. 11 is a sectional view illustrating a schematic sectional structure of an electronic apparatus including the display device with a touch detection function. The electronic apparatus 100 includes a cover member 101, the display device with a touch detection function 1, a backlight 102, and a housing 103. The cover member 101 is a protective member for protecting the display device with a touch detection function 1, and may be, for example, a light-transmitting glass substrate or a film-like base material containing a resin material or the like. A surface on one side of the cover member 101 serves as an input surface 101a for the finger or the like to perform an input operation by being in contact therewith or in proximity thereto. The display device with a touch detection function 1 includes a pixel substrate 2 (described later) and a counter substrate 3. The counter substrate 3 is provided on the pixel substrate 2, and is disposed on the other side of the cover member 101, that is, on a surface thereof opposite to the input surface 101a.

The backlight 102 is provided on a side of the display device with a touch detection function 1 opposite to the cover member 101. The backlight 102 may be bonded onto the lower surface side of the pixel substrate 2, or may be disposed to the pixel substrate 2 with a predetermined gap provided therebetween. The backlight 102 includes a light source of, for example, light emitting diodes (LEDs), and emits light from the light source toward the pixel substrate 2. The light from the backlight 102 passes through the pixel substrate 2, and switching is performed between a portion shielding the light to prevent it from exiting and a portion allowing the light to exit according to the state of a liquid crystal at each location of the portions so that an image is displayed on the input surface 101a of the cover member 101. The backlight 102 can employ a known illumination unit, and can have various configurations. If the display panel 20 of the display device with a touch detection function 1 is a reflective liquid crystal display device, the backlight 102 need not be provided. In the reflective liquid crystal display device, the pixel substrate 2 is provided with reflective electrodes, and light coming in from the cover member 101 is reflected by the reflective electrodes, and reaches an eye of an observer through the cover member 101. The reflective liquid crystal display device may be provided with a front light instead of the backlight 102.

The housing 103 is a box-like member having an opening at an upper portion thereof, and is provided with the cover member 101 so as to cover the opening of the housing 103. An internal space formed by the housing 103 and the cover member 101 incorporates, for example, the display device with a touch detection function 1 and the backlight 102. As illustrated in FIG. 11, the display device with a touch detection function 1 and the backlight 102 are disposed on the cover member 101 side, and a space 110 is provided between the backlight 102 and the bottom of the housing 103. An electrically conductive material, such as a metal, is used for the housing 103, and the bottom of the housing 103 serves as a conductor 104 facing the drive electrode COML (not illustrated) of the display device with a touch detection function 1. The housing 103 is electrically coupled to the ground so as to be earthed. The configuration described above generates a capacitance C3 between the drive electrode COML (not illustrated) of the display device with a touch detection function 1 and the conductor 104.

When the force is applied to the input surface 101a, the pixel substrate 2 and the counter substrate 3 are deformed so as to slightly bend together with the cover member 101 toward the bottom of the housing 103. The display device with a touch detection function 1 detects a change in the capacitance C3 based on the detection principle of the self-capacitance method described above so as to obtain the amount of bend of the cover member 101, the display device with a touch detection function 1, and the backlight 102. Thereby, the force applied to the input surface 101a is obtained.

The space 110 between the backlight 102 and the bottom of the housing 103 may be provided with an elastic material, such as sponge or elastic rubber, that is deformable in response to the applied force. The housing 103 is not limited to being made of the electrically conductive material, such as a metal, but may be made of an insulating material such as a resin. In this case, at least the bottom of the housing 103 may be provided with a metal layer so as to form the conductor 104.

Figure 12:
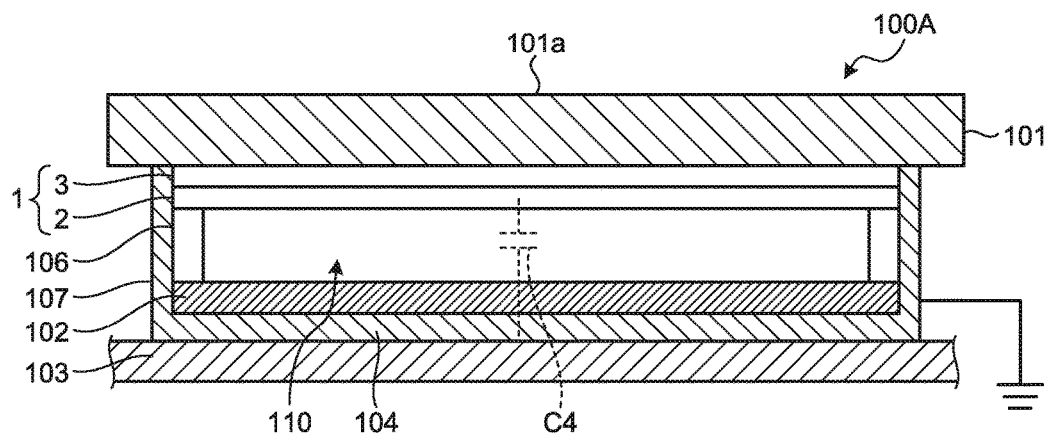
FIG. 12 is a sectional view illustrating a schematic sectional structure of an electronic apparatus of a first modification of the present invention.

FIG. 12 is a sectional view illustrating a schematic sectional structure of an electronic apparatus of a first modification. In the present modification, a display device housing 107 is provided. The cover member 101 is provided so as to cover an opening of the display device housing 107, and an internal space formed by the display device housing 107 and the cover member 101 incorporates the display device with a touch detection function 1 and the backlight 102. The display device with a touch detection function 1 is provided on the surface of the cover member 101 opposite to the input surface 101a. The backlight 102 is provided at the bottom of the display device housing 107. A spacer 106 is provided between the display device with a touch detection function 1 and the backlight 102, so that the space 110 is formed between the display device with a touch detection function 1 and the backlight 102. The display device housing 107 is fixed to the housing 103 of this electronic apparatus 100A, so that the display device with a touch detection function 1 and the backlight 102 are incorporated in an integrated manner in the electronic apparatus 100A.

In the present modification, an electrically conductive material, such as a metal, is used for the display device housing 107. As a result, the bottom of the display device housing 107 serves as the conductor 104. The display device housing 107 is electrically coupled to the ground so as to be earthed. With the configuration described above, a capacitance C4 is generated between the conductor 104 and the drive electrode COML (not illustrated) of the display device with a touch detection function 1. The display device with a touch detection function 1 can detect the force applied to the input surface 101a by detecting a change in the capacitance C4 based on the detection principle of the self-capacitance method described above.

In the present modification, the display device housing 107 is made of the electrically conductive material, such as a metal, and the bottom thereof serves as the conductor 104. However, the display device housing 107 is not limited to being made of such a material. The display device housing 107 may be made of an insulating material, such as a resin material, and at least the bottom of the display device housing 107 may be provided with a metal layer so as to form the conductor 104. The metal layer may be provided on the lower surface (surface facing the bottom of the display device housing 107) of the backlight 102. Although the display device housing 107 is fixed onto the housing 103 of the electronic apparatus 100A, the fixing structure is not limited to a particular structure. For example, the cover member 101 may be fixed to the housing 103.

Figure 13:
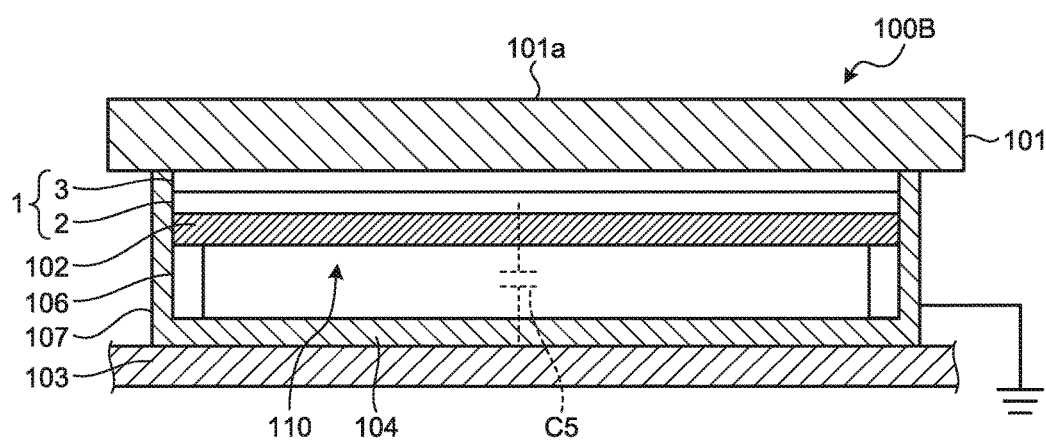
FIG. 13 is a sectional view illustrating a schematic sectional structure of an electronic apparatus of a second modification of the present invention.

FIG. 13 is a sectional view illustrating a schematic sectional structure of an electronic apparatus of a second modification. In this electronic apparatus 100B of the present modification, the internal space formed by the display device housing 107 and the cover member 101 incorporates the display device with a touch detection function 1 and the backlight 102. The display device with a touch detection function 1 is provided on the surface of the cover member 101 opposite to the input surface 101a. The backlight 102 is provided on a surface of the display device with a touch detection function 1 opposite to the cover member 101. The spacer 106 is provided between the backlight 102 and the display device housing 107, so that the space 110 is formed between the backlight 102 and the display device housing 107.

Also in the present modification, the bottom of the display device housing 107 serves as the conductor 104, and a capacitance C5 is generated between the conductor 104 and the drive electrode COML (not illustrated) of the display device with a touch detection function 1. The display device with a touch detection function 1 can detect the force applied to the input surface 101a by detecting a change in the capacitance C5 based on the detection principle of the self-capacitance method described above.

Figure 14:
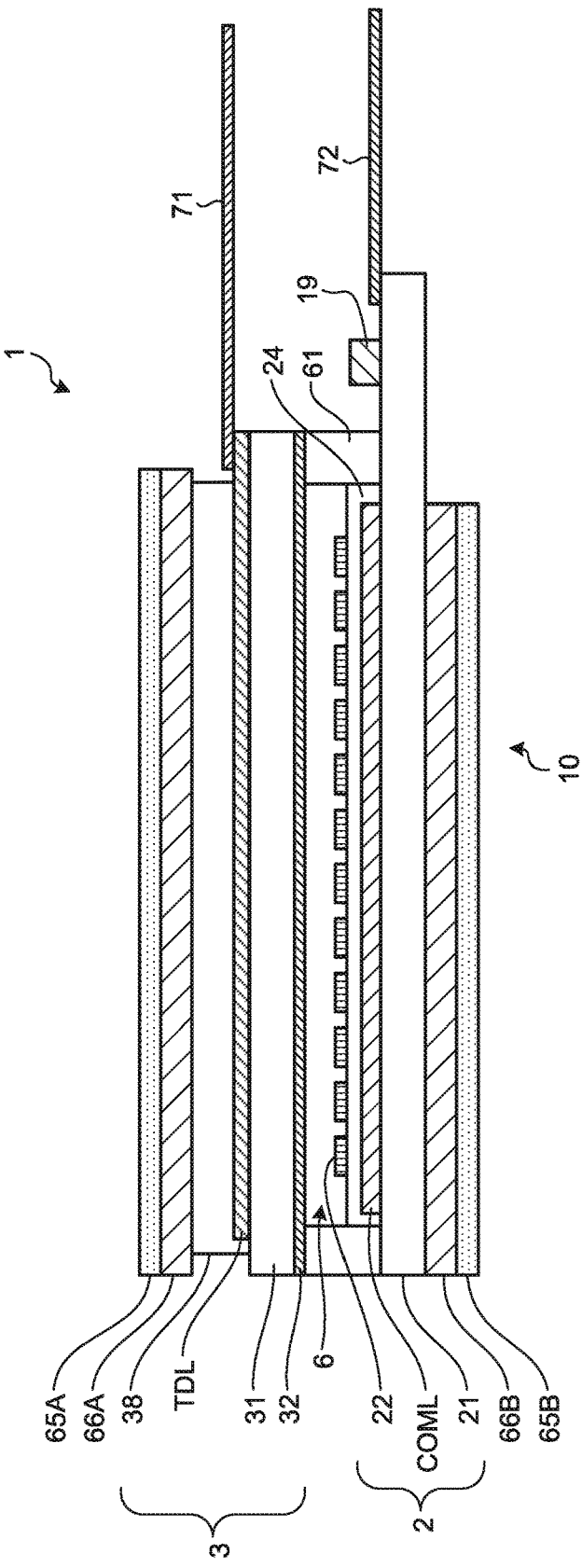
FIG. 14 is a sectional view illustrating a schematic sectional structure of the display device with a touch detection function according to the first embodiment.
Figure 15:
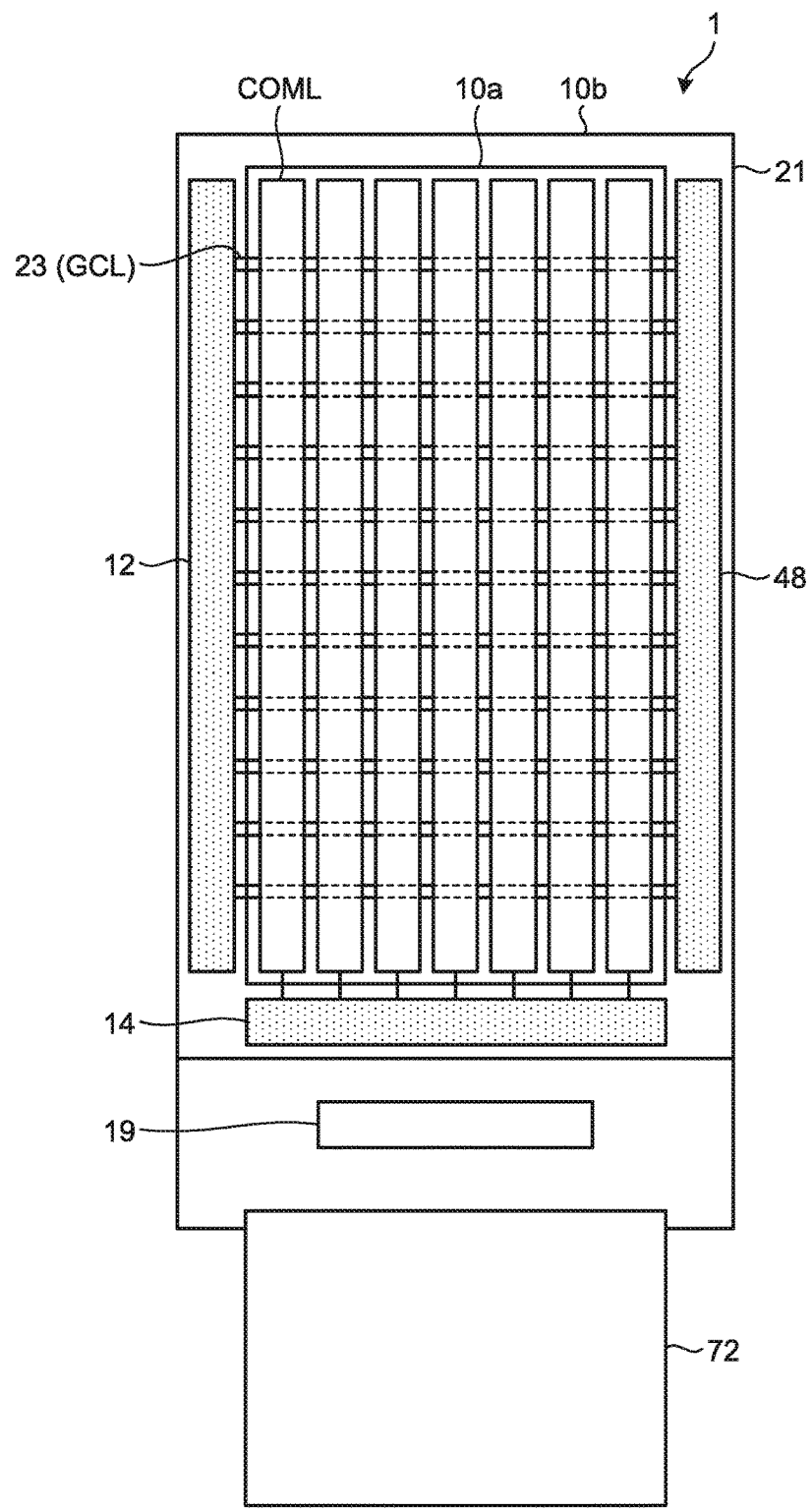
FIG. 15 is a plan view schematically illustrating a first substrate of the display device with a touch detection function.
Figure 16:
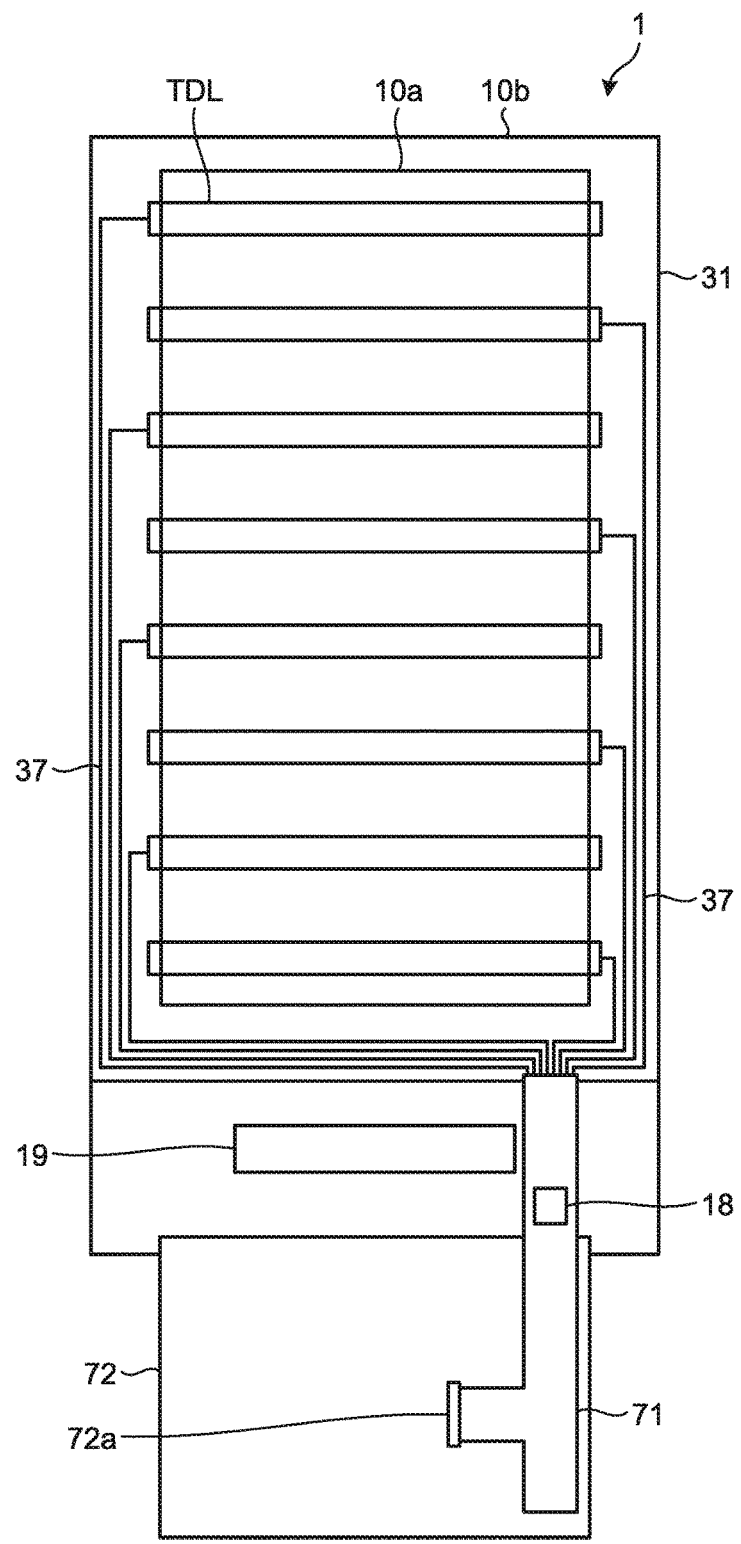
FIG. 16 is a plan view schematically illustrating a second substrate of the display device with a touch detection function.

The following describes a configuration example of the display device with a touch detection function 1. FIG. 14 is a sectional view illustrating a schematic sectional structure of the display device with a touch detection function according to the first embodiment. FIG. 15 is a plan view schematically illustrating a first substrate of the display device with a touch detection function. FIG. 16 is a plan view schematically illustrating a second substrate of the display device with a touch detection function.

As illustrated in FIG. 14, the display unit with a touch detection function 10 includes the pixel substrate 2, the counter substrate 3 that is disposed so as to face a surface of the pixel substrate 2 in the vertical direction, and a liquid crystal layer 6 serving as a display function layer that is interposed between the pixel substrate 2 and the counter substrate 3.

The pixel substrate 2 includes a first substrate 21 serving as a circuit substrate, a plurality of pixel electrodes 22, a plurality of drive electrodes COML, and an insulating layer 24. Thin-film transistors (TFTs) serving as switching elements are arranged corresponding to the pixel electrodes 22 on the first substrate 21. The pixel electrodes 22 are provided above the first substrate 21, and are arranged in a matrix in a plan view. The drive electrodes COML are provided between the first substrate 21 and the pixel electrodes 22. The insulating layer 24 insulates the pixel electrodes 22 from the drive electrodes COML. A polarizing plate 65B may be provided on the lower side of the first substrate 21 with an adhesive layer 66B interposed therebetween.

The first substrate 21 is provided with a display control integrated circuit (IC) 19. The display control IC 19 is a chip that is chip-on-glass (COG) mounted on the first substrate 21, and incorporates the controller 11 described above. A flexible substrate 72 is coupled to an end of the first substrate 21. The display control IC 19 outputs the control signals to, for example, scan signal lines GCL and pixel signal lines SGL (to be described later) based on the video signal Vdisp (refer to FIG. 1) supplied from an external host IC (not illustrated).

The counter substrate 3 includes a second substrate 31 and a color filter 32 provided on one surface of the second substrate 31. The other surface of the second substrate 31 is provided with the detection electrodes TDL serving as detection electrodes of the touch panel 30. A protective layer 38 is provided on the detection electrodes TDL. Furthermore, a polarizing plate 65A is provided above the detection electrodes TDL with an adhesive layer 66A interposed therebetween. A flexible substrate 71 is coupled to the second substrate 31. The flexible substrate 71 is coupled to the detection electrodes TDL through frame wires described later. The color filter 32 may be disposed on the first substrate 21. In the present embodiment, the first substrate 21 and the second substrate 31 are, for example, glass substrates.

The first substrate 21 and the second substrate 31 are arranged so as to face each other with a spacer 61 providing a predetermined gap therebetween. The liquid crystal layer 6 is provided in a space between the first substrate 21 and the second substrate 31. The liquid crystal layer 6 modulates light passing therethrough according to the state of an electric field, and is made of, for example, liquid crystals of a horizontal electric field mode, such as an in-plane switching (IPS) mode, including a fringe field switching (FFS) mode. Orientation films may be provided between the liquid crystal layer 6 and the pixel substrate 2 and between the liquid crystal layer 6 and the counter substrate 3 illustrated in FIG. 14.

As illustrated in FIG. 15, the display device with a touch detection function 1 includes a display area 10a for displaying an image and a frame area 10b outside the display area 10a. The display area 10a has a rectangular shape having two opposing long sides and two opposing short sides. The frame area 10b has a frame shape surrounding the four sides of the display area 10a.

The drive electrodes COML are provided in the display area 10a of the first substrate 21. The drive electrodes COML extend in a direction along the long sides of the display area 10a, and are arranged in a direction along the short sides of the display area 10a. A light-transmitting electrically conductive material, such as indium tin oxide (ITO), is used for the drive electrodes COML.

A plurality of above-mentioned wires 23 extend in the direction along the short sides of the display area 10a, and are arranged in the direction along the long sides of the display area 10a. The wires 23 extend in a direction intersecting the extending direction of the drive electrodes COML so as to overlap the drive electrodes COML, and are arranged in the extending direction of the drive electrodes COML.

The first drive electrode driver 14 and the display control IC 19 are disposed on a short-side side of the frame area 10b of the first substrate 21, and the gate driver 12 and the second drive electrode driver 48 are disposed on long-side sides of the frame area 10b. The flexible substrate 72 is coupled to the short-side side of the frame area 10b. The first drive electrode driver 14 and the flexible substrate 72 are arranged near an end in the extending direction of the drive electrodes COML. This arrangement can reduce the length of wires from the drive electrodes COML, and reduce the area of the frame area 10b.

The wire 23 is also used as the scan signal lines GCL (described later), so that the wire 23 is coupled to both the second drive electrode driver 48 and the gate driver 12, and is supplied with signals from both of them. In FIG. 15, the second drive electrode driver 48 is disposed on one long side of the frame area 10b, and the gate driver 12 is disposed on the other long side of the frame area 10b. The second drive electrode driver 48 and the gate driver 12 are not limited to being disposed in this manner, but may be both disposed on one long side.

As illustrated in FIG. 16, the detection electrodes TDL are provided in the display area 10a of the second substrate 31. The detection electrodes TDL extend in the direction along the short sides of the display area 10a, and are arranged in the direction along the long sides of the display area 10a. The detection electrodes TDL are made of, for example, a light-transmitting electrically conductive material, such as indium tin oxide (ITO). The detection electrodes TDL are not limited to being made of such a material, but may be made of thin metallic wires using a metallic material. A frame wire 37 is coupled to ends of the detection electrodes TDL. The frame wire 37 extends along the long sides of the frame area 10b, and is coupled to the flexible substrate 71 that is provided on the short-side side of the frame area 10b of the second substrate 31. A touch detection IC 18 is mounted on the flexible substrate 71. The detector 40 illustrated in FIG. 1 is mounted on the touch detection IC 18, and the first detection signal Vdet1 output from each of the detection electrodes TDL is supplied to the touch detection IC 18 through the frame wire 37 and the flexible substrate 71.

In the present embodiment, the detector 40 is a touch driver IC that is mounted on the flexible substrate 71. However, some of the functions of the detector 40 may be provided as a function of another microproces sing unit (MPU). Specifically, a circuit, such as the MPU, provided separately from the touch driver IC may perform some functions (such as denoising) among various functions, such as the A/D conversion and the denoising that can be provided as functions of the touch driver IC.

The flexible substrate 71 is coupled to the flexible substrate 72 through a connector unit 72a. The touch detection IC 18 may have some functions of the second drive electrode driver 48 (refer to FIG. 1). In this case, the DC voltage signal Vdc or the guard signal Vsg1 is supplied from the touch detection IC 18 to the wire 23 through the flexible substrates 71 and 72.

Figure 17:
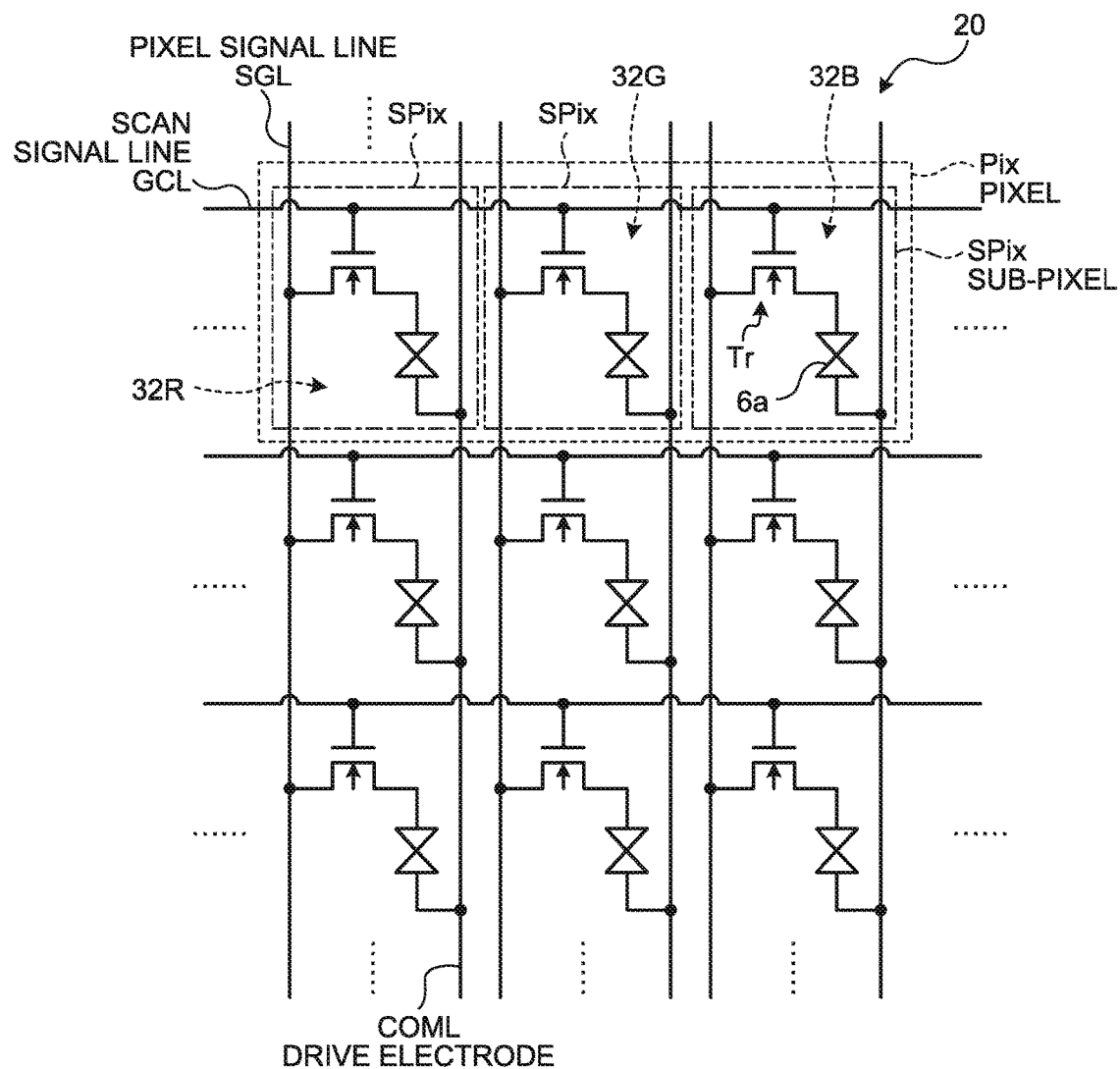
FIG. 17 is a circuit diagram illustrating a pixel array of a display unit with a touch detection function according to the first embodiment.

The following describes a display operation of the display panel 20. FIG. 17 is a circuit diagram illustrating a pixel array of the display unit with a touch detection function according to the first embodiment. As illustrated in FIG. 17, switching elements (hereinafter, called TFT elements) Tr of the sub-pixels SPix, and wires, such as the pixel signal lines SGL and the scan signal lines GCL, are formed on the first substrate 21 (refer to FIG. 14). The pixel signal lines SGL supply the pixel signals Vpix to each of the pixel electrodes 22 and the scan signal lines GCL supply the drive signals for driving the TFT elements Tr. The pixel signal lines SGL and the scan signal lines GCL extend in a plane parallel to a surface of the first substrate 21.

The display panel 20 illustrated in FIG. 17 includes the sub-pixels SPix arranged in a matrix. Each of the sub-pixels SPix includes corresponding one of the TFT elements Tr and a liquid crystal element 6a. The TFT element Tr is constituted by a thin-film transistor, and in the present example, constituted by an n-channel metal oxide semiconductor (MOS) TFT. The source of the TFT element Tr is coupled to one of the pixel signal lines SGL; the gate thereof is coupled to one of the scan signal lines GCL; and the drain thereof is coupled to one end of the liquid crystal element 6a. One end of the liquid crystal element 6a is coupled to the drain of the TFT element Tr, and the other end thereof is coupled to the drive electrode COML.

The sub-pixel SPix is mutually coupled through the scan signal line GCL with another sub-pixel SPix belonging to the same row of the display panel 20. The scan signal line GCL is coupled to the gate driver 12 (refer to FIG. 1), and is supplied with the scan signal Vscan from the gate driver 12. The sub-pixel SPix is mutually coupled through the pixel signal line SGL with another sub-pixel SPix belonging to the same column of the display panel 20. The pixel signal line SGL is coupled to the source driver 13 (refer to FIG. 1), and is supplied with the pixel signal Vpix from the source driver 13. The sub-pixel SPix is further mutually coupled through the drive electrode COML with another sub-pixel SPix belonging to the same column. The drive electrode COML is coupled to the first drive electrode driver 14 (refer to FIG. 1), and is supplied with the first drive signal Vcom from the first drive electrode driver 14. This means that the sub-pixels SPix belonging to the same one of the columns share one of the drive electrodes COML. In the present embodiment, the direction of extension of the drive electrodes COML is parallel to that of the pixel signal lines SGL.

The gate driver 12 illustrated in FIG. 1 drives so as to sequentially scan the scan signal lines GCL. The gate driver 12 applies the scan signal Vscan (refer to FIG. 1) to the gates of the TFT elements Tr of the sub-pixels SPix through the scan signal lines GCL so as to sequentially select, as a target of display driving, one row (one horizontal line) of the sub-pixels SPix. The source driver 13 supplies the pixel signals Vpix through the pixel signal lines SGL to the sub-pixels SPix constituting the selected one horizontal line. The sub-pixels SPix are configured to display one horizontal line at a time according to the supplied pixel signals Vpix. While the display operation is performed, the first drive electrode driver 14 apples the first drive signals Vcom to the drive electrodes COML. The pixel electrodes 22 are supplied with a common potential by each of the first drive signals Vcom for the display operation.

The color filter 32 illustrated in FIG. 14 may include periodically arranged color regions colored in, for example, three colors of red (R), green (G), and blue (B). Color regions 32R, 32G, and 32B of the three colors of R, G, and B are associated, as one set, with the sub-pixels SPix illustrated in FIG. 17, and the sub-pixels SPix corresponding to the color regions 32R, 32G, and 32B of the three colors constitute a pixel Pix as a one set. As illustrated in FIG. 14, the color filter 32 faces the liquid crystal layer 6 in a direction orthogonal to the first substrate 21. The color filter 32 may have a combination of other colors as long as being colored in different colors from each other. The color filter 32 is not limited to having a combination of three colors, but may have a combination of four or more colors.

As illustrated in FIG. 17, in the present embodiment, the drive electrodes COML extend in the direction parallel to the extending direction of the pixel signal lines SGL, and extend in the direction intersecting the extending direction of the scan signal lines GCL. This arrangement allows the wire from the drive electrodes COML to be led toward the short-side side of the frame area 10b (toward the flexible substrate 72) (refer to FIG. 15). As a result, compared with a case of providing the drive electrodes COML in the direction orthogonal to the pixel signal lines SGL, the first drive electrode driver 14 need not be provided on a long-side side of the frame area 10b, so that the frame area 10b can have a smaller width. The drive electrodes COML are not limited to extending in this direction, but may extend, for example, in the direction parallel to the scan signal lines GCL.

Figure 18:
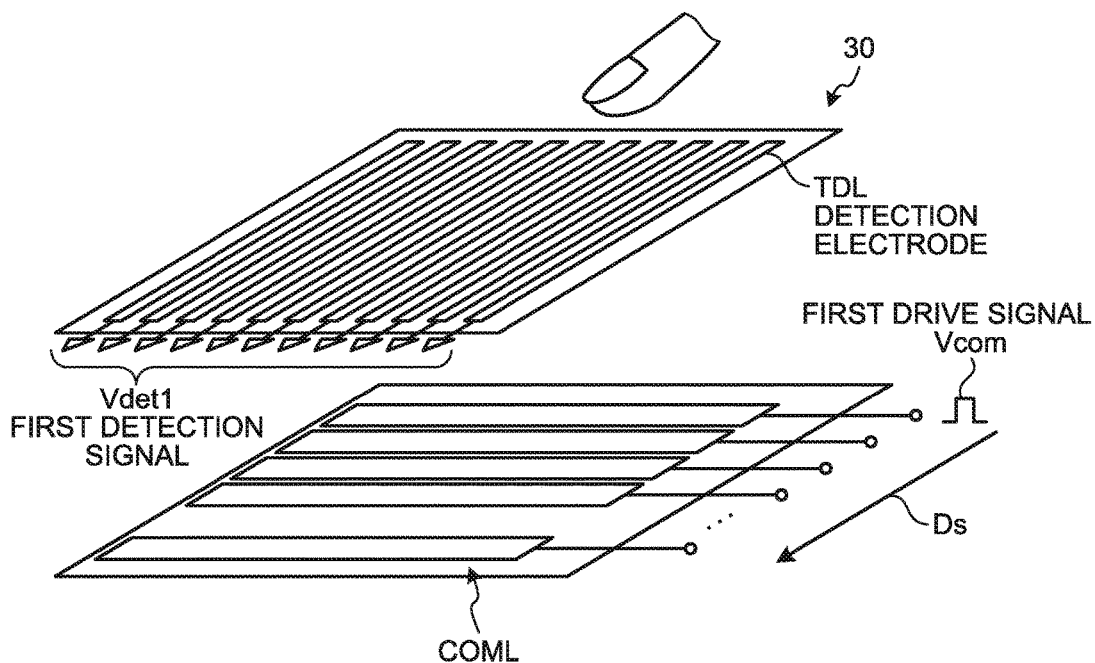
FIG. 18 is a perspective view illustrating a configuration example of drive electrodes and detection electrodes of the display unit with a touch detection function according to the first embodiment.

The drive electrodes COML illustrated in FIGS. 14 and 15 serve as common electrodes each supplying the common potential to the pixel electrodes 22 of the display panel 20, and also serve as drive electrodes when the touch detection using the mutual capacitance method is performed on the touch panel 30. The drive electrodes COML may serve as detection electrodes when the touch detection using the self-capacitance method is performed on the touch panel 30. FIG. 18 is a perspective view illustrating a configuration example of the drive electrodes and the detection electrodes of the display unit with a touch detection function according to the first embodiment. The touch panel 30 is constituted by the drive electrodes COML provided on the pixel substrate 2 and the detection electrodes TDL provided on the counter substrate 3.

The drive electrodes COML include a plurality of stripe-shaped electrode patterns extending in the right-left direction of FIG. 18. The detection electrodes TDL include a plurality of electrode patterns extending in a direction intersecting the extending direction of the electrode patterns of the drive electrodes COML. The detection electrodes TDL face the drive electrodes COML in the direction orthogonal to the surface of the first substrate 21 (refer to FIG. 14). Each of the electrode patterns of the detection electrodes TDL is coupled to the input to the detection signal amplifier 42 of the detector 40 (refer to FIG. 1). An electrostatic capacitance is formed at an intersecting portion between each of the electrode patterns of the drive electrodes COML and that of the detection electrodes TDL.

The detection electrodes TDL and the drive electrodes COML (drive electrode blocks) are not limited to having the divided stripe shapes. The detection electrodes TDL and the drive electrodes COML may have, for example, comb-tooth shapes. Otherwise, the detection electrodes TDL and the drive electrodes COML only need to be divided into a plurality of portions. The shape of the slits dividing the drive electrodes COML may be linear or curved.

When the touch panel 30 performs the touch detection operation using the mutual capacitance method, this configuration causes the first drive electrode driver 14 to drive the drive electrodes so as to sequentially scan the drive electrode blocks in a time-division manner, so that each detection block of the drive electrodes COML is sequentially selected along a scan direction Ds. The first detection signal Vdet1 is output from the detection electrode TDL, so that the touch detection of one detection block is performed. That is, each of the drive electrode blocks corresponds to the drive electrode E1 in the basic principle of the mutual capacitance touch detection described above, and the detection electrode TDL corresponds to the detection electrode E2. The touch panel 30 is configured to detect the touch input according to this basic principle. As illustrated in FIG. 18, in the touch panel 30, the detection electrodes TDL and the drive electrodes COML intersecting each other constitute a capacitance touch sensor in a matrix form. Consequently, by scanning the entire touch detection surface of the touch panel 30, the touch panel 30 can detect a position where the conductor externally comes in contact therewith or in proximity thereto.

Figure 19:
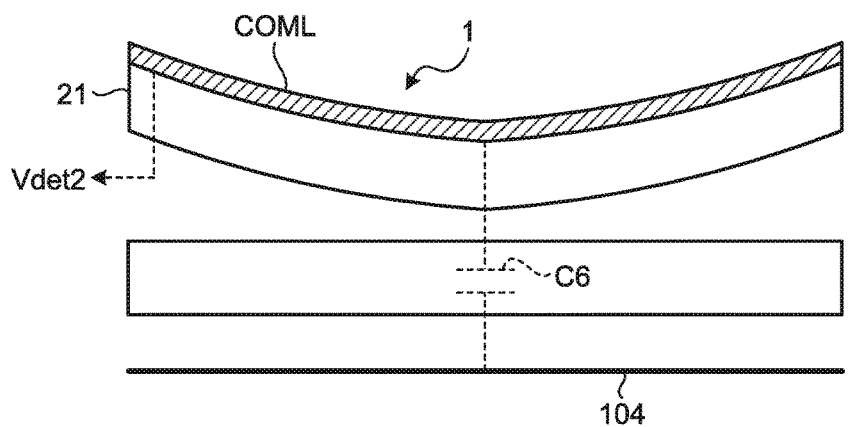
FIG. 19 is an explanatory diagram for explaining force detection by the display device with a touch detection function according to the first embodiment.

FIG. 19 is an explanatory diagram for explaining the force detection performed by the display device with a touch detection function according to the first embodiment. As described above, the conductor 104 (e.g., the housing 103 or the display device housing 107) facing the drive electrodes COML is provided in a separate manner from the first substrate 21, and a capacitance C6 is generated between the drive electrode COML and the conductor 104. When the force is applied to the input surface 101a of the cover member 101 (refer to FIGS. 11 to 13), the cover member 101 is deformed so as to slightly bend toward the conductor 104 depending on the force. The first substrate 21 of the display device with a touch detection function 1 is bent together with the cover member 101, which reduces the gap between the drive electrode COML and the conductor 104, thereby increasing the capacitance C6.

The drive electrode COML outputs the second detection signal Vdet2 based on the detection principle of the self-capacitance method described above. That is, the drive electrode COML corresponds to the detection electrode E2 in the detection principle of the self-capacitance method. In the present embodiment, the drive electrode COML serves also as the common electrode supplying the common potential to the pixel electrodes 22 of the display panel 20, as the drive electrode when the touch detection using the mutual capacitance method is performed on the touch panel 30, and as the detection electrode when the force detection using the self-capacitance method is performed. The level of the force applied to the input surface 101a can be detected based on the second detection signal Vdet2 output from each of the drive electrodes COML. In the present embodiment, the position of the touch input can be detected, and the level of the force applied to the touch input position can also be detected. The display device with a touch detection function 1 can combine these detection results, and reflect the combination in various applications.

Figure 20:
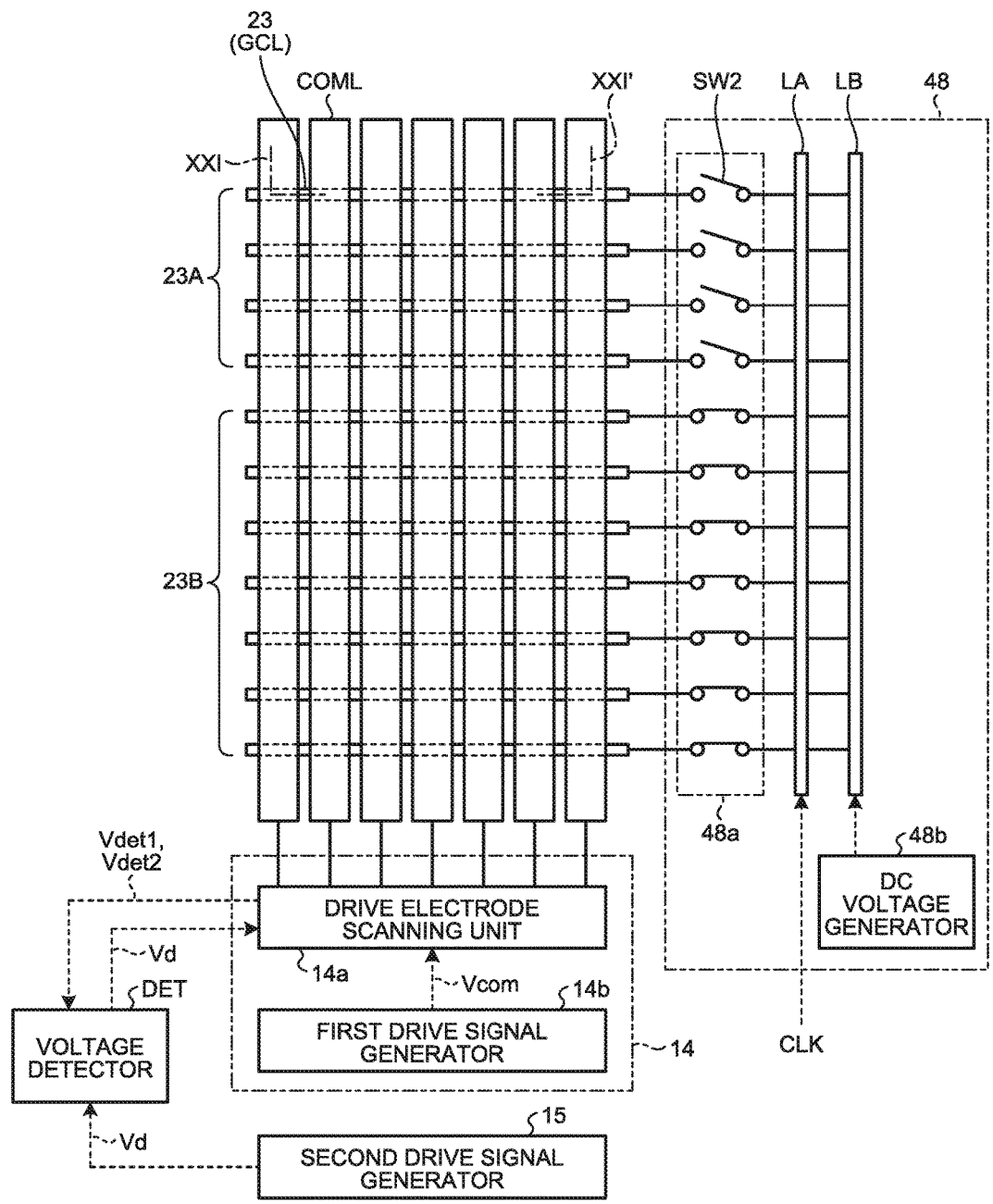
FIG. 20 is a schematic plan view illustrating an enlarged view of the drive electrodes and wiring according to the first embodiment.
Figure 21:
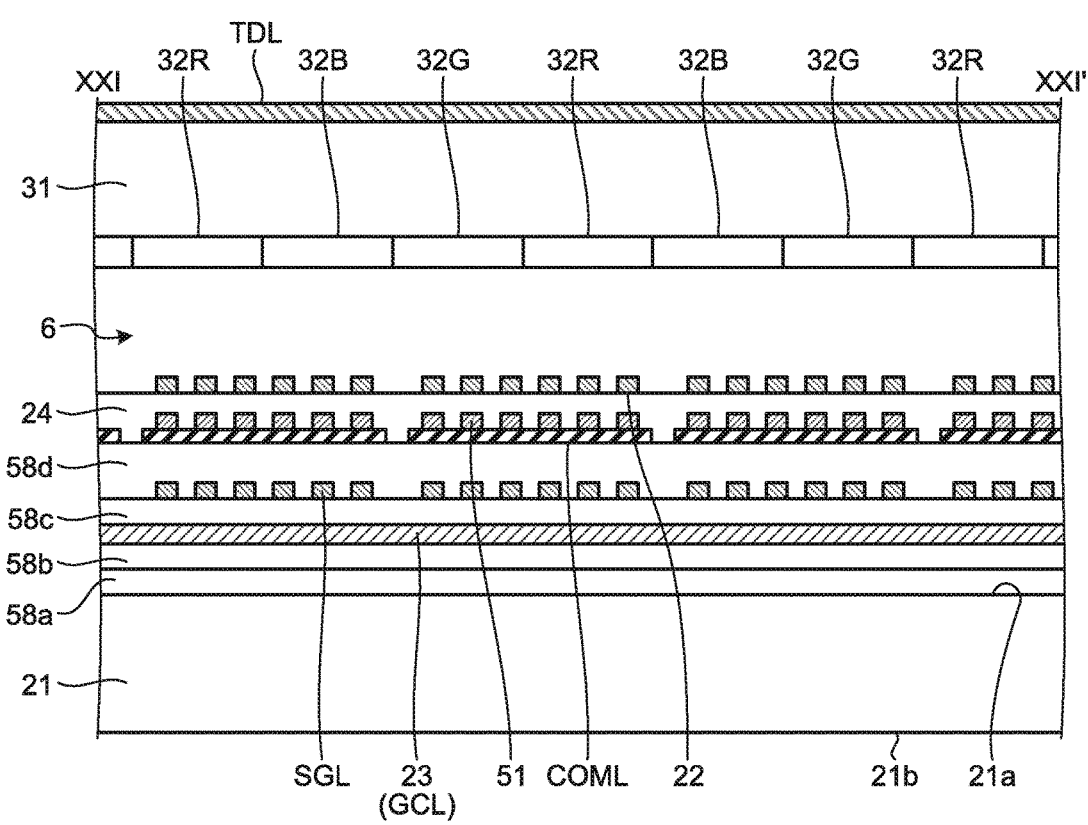
FIG. 21 is a sectional view obtained by being cut along line XXI-XXI' in FIG. 20.

The following describes a method of driving the drive electrodes COML and the wire 23 in the force detection operation. FIG. 20 is a schematic plan view illustrating an enlarged view of the drive electrodes and the wiring according to the first embodiment. FIG. 21 is a sectional view obtained by being cut along line XXI-XXI' in FIG. 20. As illustrated in FIG. 20, the wire 23 is provided so as to overlap the drive electrodes COML, and extends in the direction intersecting the extending direction of the drive electrodes COML. A plurality of such wires 23 are arranged in the extending direction of the drive electrodes COML.

As illustrated in FIG. 21, the scan signal lines GCL are provided on a first surface 21a side of the first substrate 21 with insulating layers 58a and 58b interposed therebetween. In the present embodiment, the scan signal lines GCL are partially used also as the wire 23. An insulating layer 58c is provided on the wire 23 (scan signal lines GCL), and the pixel signal lines SGL are provided on the insulating layer 58c. A planarizing layer 58d is provided on the pixel signal lines SGL, and the drive electrodes COML are provided on the planarizing layer 58d. Electrically conductive wire 51 is provided on and in contact with the drive electrodes COML. The insulating layer 24 is provided on the drive electrodes COML and the electrically conductive wire 51, and the pixel electrodes 22 are provided on the insulating layer 24. In this manner, the wire 23 is provided closer to the first substrate 21 side than the drive electrodes COML in a separate manner from the drive electrodes COML. Since the scan signal lines GCL are used also as the wire 23, the number of layers need not be increased to provide the wire 23, and new wires need not be additionally provided. The wire 23 may be provided as a wire different from the scan signal lines GCL, and may be provided at a different layer from the scan signal lines GCL, for example, on the insulating layer 58a. The conductor 104 (refer, for example, to FIG. 11) (not illustrated in FIG. 21) is provided on a second surface 21b side of the first substrate 21 in a separate manner from the first substrate 21.

The electrically conductive wire 51 is provided in a position overlapping the pixel signal lines SGL, and extends along the extending direction of the pixel signal lines SGL. The electrically conductive wire 51 is made of at least one metallic material among aluminum (Al), copper (Cu), silver (Ag), molybdenum (Mo), and alloys thereof. Providing the electrically conductive wire 51 reduces the apparent resistance value of the drive electrodes COML (combined resistance value of the drive electrodes COML and the electrically conductive wire 51) to a level lower than that in the case where only the drive electrodes COML are provided.

As illustrated in FIG. 20, the first drive electrode driver 14 includes a drive electrode scanning unit 14a and a first drive signal generator 14b. The first drive signal generator 14b generates the first drive signal Vcom, and supplies it to the drive electrode scanning unit 14a. When the mutual capacitance touch detection described above is performed, the drive electrode scanning unit 14a performs scanning so as to sequentially select each detection block of the drive electrodes COML, and supplies the first drive signal Vcom to the selected one detection block of the drive electrodes COML.

A second drive signal generator 15 is coupled to the drive electrode scanning unit 14a through the voltage detector DET. When the self-capacitance force detection described above is performed, the second drive signal generator 15 supplies a second drive signal Vd to the voltage detector DET. The drive electrode scanning unit 14a sequentially or simultaneously selects the drive electrodes COML. The selected drive electrodes COML are subjected to a change in potential so as to have the same potential as that of the second drive signal Vd supplied to the voltage detector DET. Each of the drive electrodes COML outputs an output signal corresponding to a change in capacitance between the drive electrode COML and the conductor 104 to the detector 40 (not illustrated in FIG. 20). The second drive signal generator 15 may be included in the second drive electrode driver 48, or may be mounted on the touch detection IC 18 (refer to FIG. 16). The second drive signal Vd is supplied to the drive electrode scanning unit 14a through the voltage detector DET, but may be supplied to the drive electrode scanning unit 14a without passing through the voltage detector DET.

As illustrated in FIG. 20, the second drive electrode driver 48 includes a wire scanning unit 48a, a DC voltage generator 48b, a clock signal wire LA, and a power supply wire LB. The wire scanning unit 48a turns switches SW2 coupled to each of the wires 23 between ON (closed) and OFF (opened) so as to select wires 23 to be driven from all the wires 23. The switches SW2 are turned ON or OFF based on a clock signal CLK supplied through the clock signal wire LA. The wire scanning unit 48a is coupled to the DC voltage generator 48b through the power supply wire LB. The DC voltage generator 48b generates the DC voltage signal Vdc, and supplies it to the wire scanning unit 48a. The clock signal CLK is a signal supplied from, for example, a clock signal generator included in the controller 11 (refer to FIG. 1).

In the example illustrated in FIG. 20, a wire 23B is selected as wires to be driven and a wire 23A is not selected as wires to be driven among the wires 23 in the wire scanning unit 48a. That is, the switches SW2 coupled to the wire 23A are OFF, so that the DC voltage signal Vdc is not supplied to the wire 23A. At this time, the wire 23A is in a floating state where no voltage signal is supplied thereto and the potential thereof is not fixed. The switches SW2 coupled to the wire 23B are ON, so that the DC voltage signal Vdc is supplied to the wire 23B. A parasitic capacitance is generated between the wire 23B and the drive electrodes COML. This parasitic capacitance increases a time constant τ of the drive electrodes COML in a region overlapping the wire 23B, and thereby lowers responsiveness of the drive electrodes COML to the supplied second drive signal Vd. In contrast, the drive electrodes COML in a region overlapping the wire 23A are restrained from generating the parasitic capacitance, and thereby is kept from lowering in the responsiveness to the second drive signal Vd.

Consequently, the change in the capacitance between the drive electrodes COML and the conductor 104 is detected in the region of the drive electrodes COML overlapping the wire 23A, and is not detected in the region of the drive electrodes COML overlapping the wire 23B. As a result, the force can be detected in the region of the drive electrodes COML overlapping the wire 23A, and is not detected in the region of the drive electrodes COML overlapping the wire 23B. The wire scanning unit 48a sequentially changes the combination between the wire 23A of the wires 23 not selected as wires to be driven and the wire 23B of the wires 23 selected as wires to be driven, and performs the selection a plurality of times. This enables the detection of the force at a plurality of regions divided along the extending direction of the drive electrodes COML. This, in turn, can increase the resolution of the force detection along the extending direction of the drive electrodes COML, and thereby enables accurate detection of the force. Since the drive electrodes COML are used to detect the force, the coordinates of the input position of the force in the arrangement direction of the drive electrodes COML can be detected.

Figure 22A:
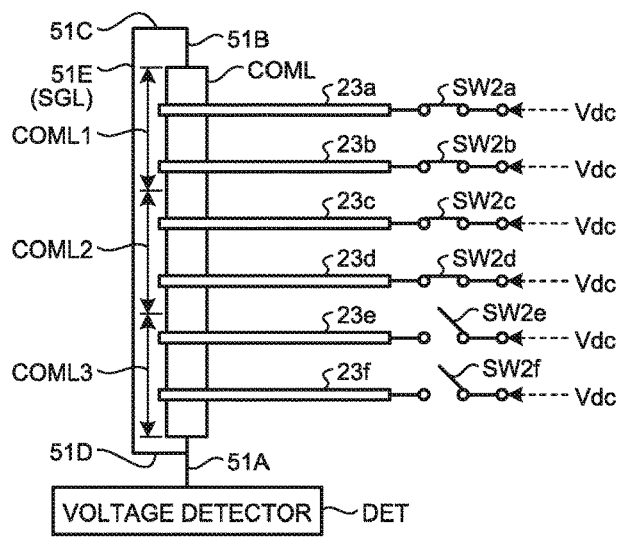
FIGS. 22A to 22C are explanatory diagrams for explaining operation examples of the force detection.
Figure 22B:
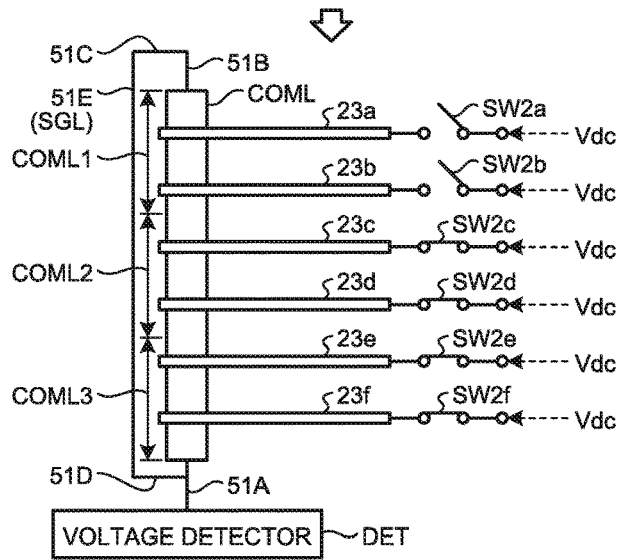
Figure 22C:
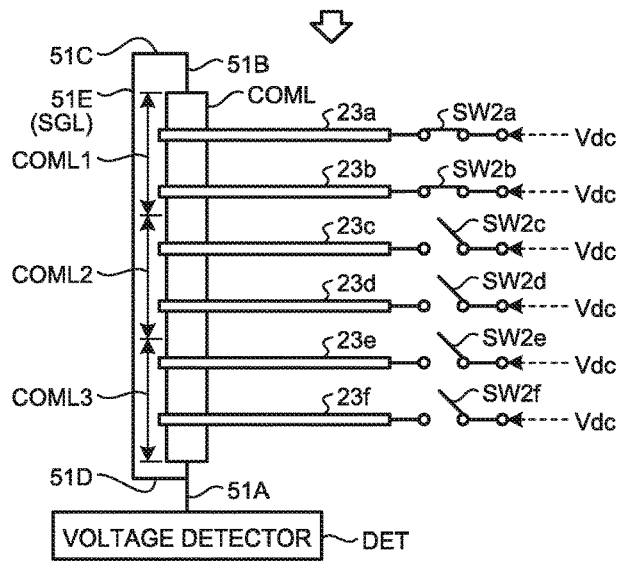
Figure 23A:
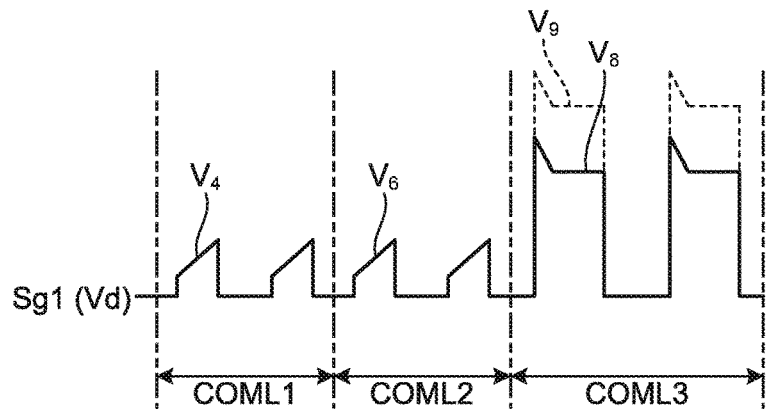
FIGS. 23A to 23C are diagrams schematically illustrating output waveforms of respective regions of the drive electrodes.
Figure 23B:
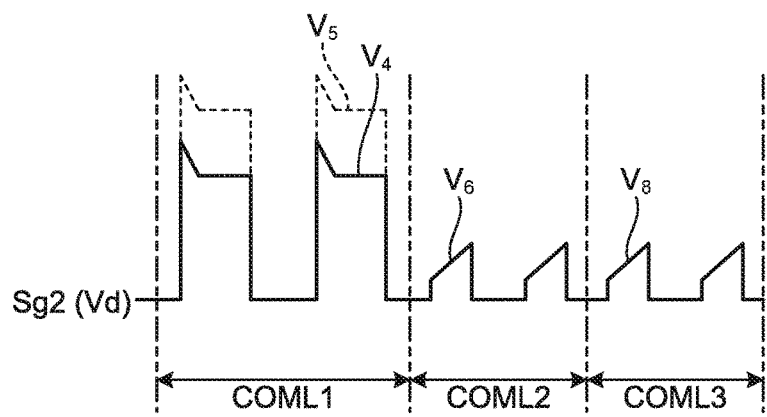
Figure 23C:
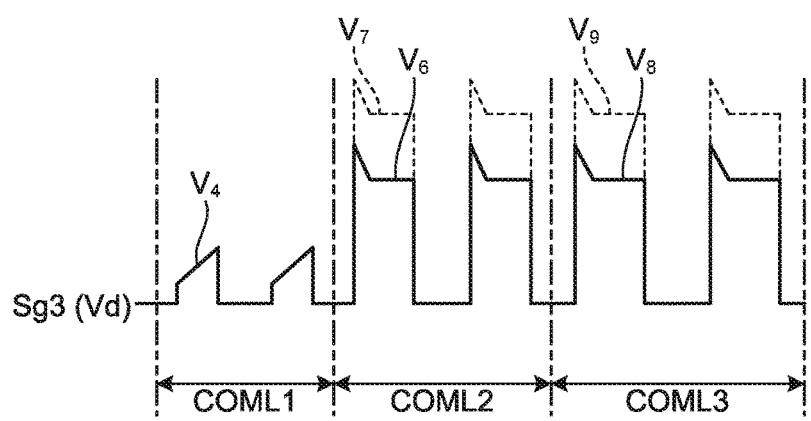

The following describes examples of the force detection operation by the display device with a touch detection function 1 of the present embodiment. FIGS. 22A to 22C are explanatory diagrams for explaining operation examples of the force detection. FIGS. 23A to 23C are diagrams schematically illustrating output waveforms of respective regions of the drive electrodes. FIG. 24 is a table illustrating relations between the pressed position and output signal levels obtained as respective detection results and calculation results.

FIGS. 22A to 22C illustrate the force detection operations when different wires 23 are selected as wires to be driven. The force detection operation of FIG. 22A is referred to as "Detection 1"; the force detection operation of FIG. 22B as "Detection 2"; and the force detection operation of FIG. 22C as "Detection 3". For easiness of understanding, FIGS. 22A to 22C illustrate one of the drive electrodes COML and six wires 23a to 23f that are arranged so as to intersect the drive electrodes COML. Switches SW2a to SW2f are coupled to the wires 23a to 23f, respectively, and are each supplied with the DC voltage signal Vdc from the DC voltage generator 48b of the second drive electrode driver 48 described above.

A region overlapping the drive electrode COML is illustrated by being divided into three regions of a first region COML1, a second region COML2, and a third region COML3. The three regions are arranged along the extending direction of the drive electrodes COML from an end on the voltage detector DET side in the order of the third region COML3, the second region COML2, and the first region COML1. The wires 23a and 23b are provided so as to intersect the first region COML1. The wires 23c and 23d are provided so as to intersect the second region COML2. The wires 23e and 23f are provided so as to intersect the third region COML3.

A detection wire 51A couples one end side (position closer to the voltage detector DET) of the drive electrode COML with the voltage detector DET. The second drive signal Vd is supplied from the voltage detector DET to one end side of the drive electrode COML through the detection wire 51A. A detection wire 51B is coupled to the other end side (position farther from the voltage detector DET) of the drive electrode COML. An auxiliary wire 51E is provided in parallel with the drive electrode COML along the extending direction thereof. An auxiliary wire 51C couples the detection wire 51B with the auxiliary wire 51E. An auxiliary wire 51D couples the detection wire 51A with the auxiliary wire 51E. In the present embodiment, the drive electrode COML, the detection wire 51A, the detection wire 51B, the auxiliary wire 51C, the auxiliary wire 51D, and the auxiliary wire 51E are coupled together in a loop. The second drive signal Vd is supplied from the voltage detector DET to the other end side of the drive electrode COML through the auxiliary wire 51E and the detection wire 51B. Consequently, the second drive signal Vd is supplied from both end sides of the drive electrode COML.

In Detection 1 illustrated in FIG. 22A, the wires 23a to 23d are selected as wires to be driven, so that the switches SW2a to SW2d are turned ON, and the wires 23a to 23d are each supplied with the DC voltage signal Vdc. The wires 23e and 23f are not selected as wires to be driven, so that the switches SW2e and SW2f are turned OFF, and the wires 23e and 23f are placed in the floating state.

FIGS. 23A to 23C correspond to "Detection 1" to "Detection 3", respectively, and schematically illustrate waveforms of output signals Sg1, Sg2 and Sg3, respectively, in the first, second, and third regions COML1, COML2, and COML3 of the drive electrode COML. Each of the waveforms illustrated in FIGS. 23A to 23C represents a measurement result of an output waveform in each of the first, second, and third regions COML1, COML2, and COML3. The waveforms output from the voltage detector DET are similar to the waveforms $V_2$ and $V_3$ illustrated in FIG. 10.

In Detection 1, parasitic capacitances are large between the drive electrode COML in the first and second regions COML1 and COML2 and the wires 23a to 23d, so that waveforms $V_4$ and $V_6$ in the first and second regions COML1 and COML2 have small amplitudes, as illustrated in FIG. 23A. As a result, the amplitude of the waveform $V_4$ or $V_6$ changes by only a small amount when force is applied to the first region COML1 or the second region COML2, so that the force is not detected. In contrast, since the wires 23e and 23f are in the floating state, parasitic capacitances between the drive electrode COML in the third region COML3 and the wires 23e and 23f are smaller than those in the first and second regions COML1 and COML2. As a result, the third region COML3 has a good responsiveness to the second drive signal Vd, so that a waveform $V_8$ has a larger amplitude than the waveforms $V_4$ and $V_6$. Consequently, when force is applied to the third region COML3, a waveform $V_9$ indicated by a dotted line is output based on the detection principle of the self-capacitance method described above. This enables the detection of the force to the third region COML3.

As illustrated in TABLE 1 of FIG. 24, in Detection 1, the signal level of a second detection signal Vdet2A output from the voltage detector DET is at a low level (Low) when a pressed position is in the first region COML1 or the second region COML2, and the signal level of the second detection signal Vdet2A is at a high level (High) when the pressed position is in the third region COML3. Thus, the force applied to the third region COML3 is selectively detected in Detection 1.

The waveform of the output signal Sgt preferably does not significantly rise in the regions (first and second regions COML1 and COML2) where the DC voltage signal Vdc is supplied to the wire 23. In this case, the frequency of the second drive signal Vd is preferably substantially twice to three times that of the time constant τ of the drive electrode COML. Thereby, the force is prevented from being detected in the regions (first and second regions COML1 and COML2) where the DC voltage signal Vdc is supplied to the wire 23, and the force is selectively detected in the region (third region COML3) where the wire 23 is placed in the floating state.

In Detection 2, as illustrated in FIG. 22B, the wires 23c to 23f are selected as wires to be driven, so that the switches SW2c to SW2f are turned ON, and the wires 23c to 23f are each supplied with the DC voltage signal Vdc. The wires 23a and 23b are not selected as wires to be driven, so that the switches SW2a and SW2b are turned OFF, and the wires 23a and 23b are placed in the floating state.

In Detection 2, parasitic capacitances are large between the drive electrode COML in the second and third regions COML2 and COML3 and the wires 23c to 23f, so that the waveforms $V_6$ and $V_8$ in the second and third regions COML2 and COML3 have small amplitudes, as illustrated in FIG. 23B. As a result, the amplitude of the waveform $V_6$ or $V_8$ changes by only a small amount even when force is applied to the second region COML2 or the third region COML3, so that the force is not detected. In contrast, since the wires 23a and 23b are in the floating state, parasitic capacitances between the drive electrode COML in the first region COML1 and the wires 23a and 23b are smaller than those in the second and third regions COML2 and COML3. As a result, the first region COML1 has a good responsiveness to the second drive signal Vd, so that the waveform $V_4$ has a larger amplitude than the waveforms $V_6$ and $V_8$.

Consequently, when force is applied to the first region COML1, a waveform $V_5$ indicated by a dotted line is output based on the detection principle of the self-capacitance method described above. This enables the detection of the force applied to the first region COML1.

As illustrated in TABLE 1 of FIG. 24, in Detection 2, the signal level of a second detection signal Vdet2B is at the high level (High) when the pressed position is in the first region COML1. When the pressed position is in the second region COML2 or the third region COML3, the signal level of the second detection signal Vdet2B is at the low level (Low). Thus, the force applied to the first region COML1 is selectively detected in Detection 2. Since the second drive signal Vd is supplied from both ends of the drive electrode COML as described above, a high detection sensitivity can be obtained even in the first region COML1 located in a position far from the voltage detector DET. The pressed position refers to a position overlapping a position of the input surface 101a (refer to FIG. 11) pressed by the finger or the like in each of the regions of the drive electrode COML.

In Detection 3, as illustrated in FIG. 22C, the wires 23a and 23b are selected as wires to be driven, so that the switches SW2a and SW2b are turned ON, and the wires 23a and 23b are each supplied with the DC voltage signal Vdc. The wires 23c to 23f are not selected as wires to be driven, so that the switches SW2c to SW2f are turned OFF, and the wires 23c to 23f are placed in the floating state.

In Detection 3, parasitic capacitances are large between the drive electrode COML in the first region COML1 and the wires 23a and 23b, so that the waveform $V_4$ in the first region COML1 has a small amplitude, as illustrated in FIG. 23C. As a result, the amplitude of the waveform $V_4$ changes by only a small amount even when force is applied to the first region COML1, so that the force is not detected. In contrast, since the wires 23c to 23f are in the floating state, parasitic capacitances between the drive electrode COML in the second and third regions COML2 and COML3 and the wires 23c to 23f are smaller than those in the first region COML1. As a result, the second and third regions COML2 and COML3 have a good responsiveness to the second drive signal Vd, so that the waveforms $V_6$ and $V_8$ have larger amplitudes than the waveform $V_4$. Consequently, when force is applied to the second region COML2 or the third region COML3, a waveform $V_7$ or $V_9$ indicated by a dotted line is output based on the detection principle of the self-capacitance method described above. This enables the detection of the force applied to the second region COML2 or the third region COML3.

As illustrated in TABLE 1 of FIG. 24, in Detection 3, the signal level of a second detection signal Vdet2C is at the low level (Low) when the pressed position is in the first region COML1. When the pressed position is in the second region COML2 or the third region COML3, the signal level of the second detection signal Vdet2C is at the high level (High). In this case, in Detection 3, both the force applied to the second region COML2 and the force applied to the third region COML3 are detected. Hence, a calculation needs to be performed to distinguish these forces from each other.

The storage unit 47 stores the information detected in Detections 1 to 3, and the coordinate extractor 45 performs the calculation based on the information detected in Detections 1 to 3 to detect the force applied to the second region COML2. Specifically, as illustrated in FIG. 24, the coordinate extractor 45 calculates a difference (Vdet2C−Vdet2A) between the information on the second detection signal Vdet2C detected in Detection 3 and the information on the second detection signal Vdet2A detected in Detection 1. If the pressed position is in the second region COML2, the signal level differs between the second detection signal Vdet2A and the second detection signal Vdet2C, so that the signal level of the calculated difference (Vdet2C−Vdet2A) is at the high level. If, instead, the pressed position is in the third region COML3, both the second detection signal Vdet2A and the second detection signal Vdet2C are at the high level (High), so that the signal level of the calculated difference (Vdet2C−Vdet2A) is at the low level. In this manner, the force applied to the second region COML2 can be detected by performing the calculation based on the information detected in Detections 1 to 3.

As described above, the display device with a touch detection function 1 of the present embodiment can detect the force applied to each of the first, second, and third regions COML1, COML2, and COML3 of the drive electrode COML by detecting the force while sequentially changing the combination between wires 23 selected as wires to be driven from all the wires 23 and wires 23 not selected as wires to be driven from all the wires 23. Consequently, the coordinate of the position subjected to the force can be calculated in the extending direction of the drive electrode COML, so that the force can be accurately detected. In the present embodiment, the mutual capacitance touch detection described above is performed using the drive electrodes COML and the detection electrodes TDL, so that the force in each input position can be detected using the information on the touch detection and the information on the force detection even when forces are applied at a plurality of locations.

Figure 25:
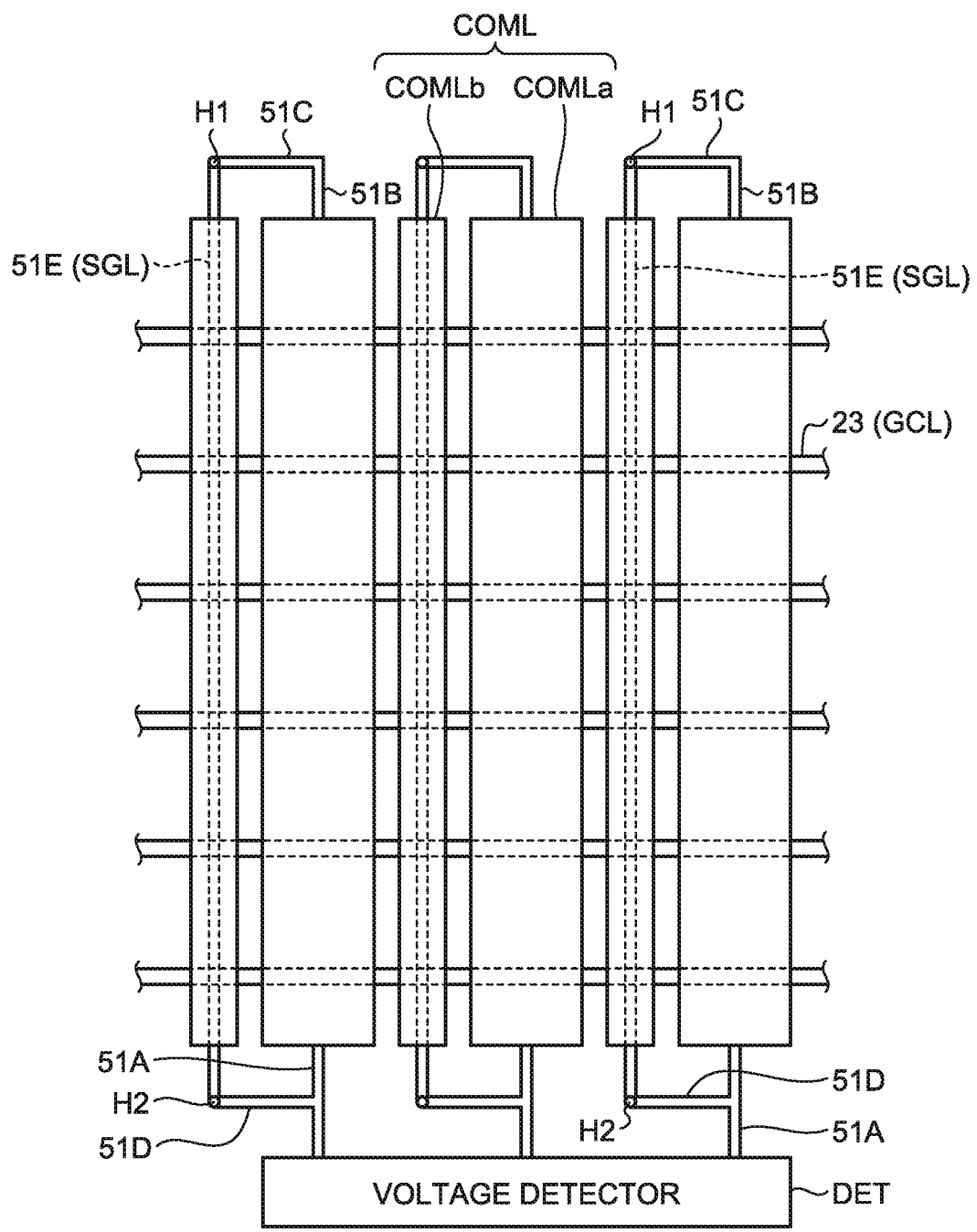
FIG. 25 is a schematic plan view illustrating an enlarged view of the drive electrodes and detection wiring.

The following describes a connection structure among the drive electrode COML and the detection wires 51A and 51B. FIG. 25 is a schematic plan view illustrating an enlarged view of the drive electrodes and the detection wiring. The detection wire 51A is coupled to one end side (position closer to the voltage detector DET) of the drive electrode COML. The detection wire 51B is coupled to the other end side (position farther from the voltage detector DET) of the drive electrode COML. The electrically conductive wire 51 illustrated in FIG. 21 is used also as the detection wires 51A and 51B, and extends in the same direction as the extending direction of the drive electrode COML while being in contact with the drive electrode COML. The auxiliary wires 51C and 51D are provided at the same layer as the detection wire 51A, and extend in a direction intersecting the detection wire 51A.

The auxiliary wire 51E is used also as a wire for supplying the second drive signal Vd by the pixel signal lines SGL illustrated in FIG. 21. The auxiliary wire 51E is provided at a different layer from the detection wire 51A, and is coupled on one end side thereof to the auxiliary wire 51D through a contact hole H2 and on the other side thereof to the auxiliary wire 51C through a contact hole H1. The detection wires 51A and 51B and the auxiliary wires 51C, 51D, and 51E are made of an electrically conductive material, such as a metal, and have a higher conductivity than the drive electrode COML. With this configuration, the second drive signal Vd is supplied from both end sides of the drive electrode COML. Consequently, the second drive signal Vd is supplied to the drive electrodes COML at portions far from the voltage detector DET even when the time constant τ of the drive electrodes COML is increased by the supply of the DC voltage signal Vdc to the wire 23.

The drive electrode COML is divided into a drive electrode COMLa for detection use that is coupled to the detection wires 51A and 51B and a drive electrode COMLb for dummy use that overlaps the auxiliary wire 51E. The drive electrode COMLb for dummy use is provided at a different layer from the auxiliary wire 51E in a separate manner therefrom. The drive electrode COMLb is preferably placed in the floating state or supplied with the guard signal Vsg1. This reduces the parasitic capacitance on the auxiliary wire 51E, so that the second drive signal Vd is supplied to the other end side of the drive electrode COML through the auxiliary wire 51E.

Figure 26:
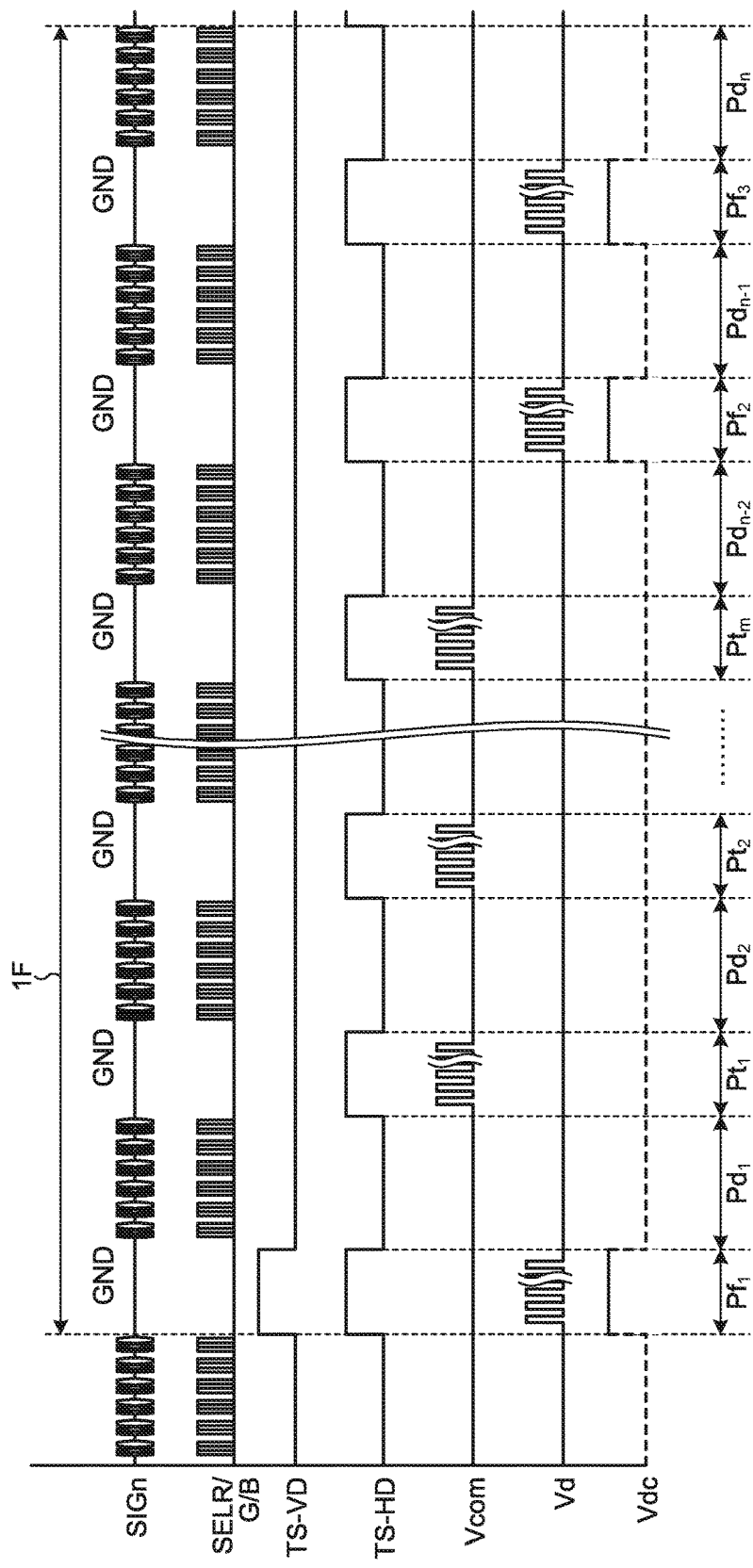
FIG. 26 is a timing waveform diagram illustrating an operation example of the display device with a touch detection function according to the first embodiment.

The following describes a method of driving the display device with a touch detection function 1 of the present embodiment. FIG. 26 is a timing waveform diagram illustrating an operation example of the display device with a touch detection function according to the first embodiment.

As an example of the method of operation of the display device with a touch detection function 1, the display device with a touch detection function 1 performs the touch detection operation (in a touch detection period), the force detection operation (in a force detection period), and the display operation (in a display operation period) in a time-division manner. The touch detection operation, the force detection operation, and the display operation may be performed in any type of time-division manner. The following describes a method of performing the touch detection operation, the force detection operation, and the display operation by dividing each of these operations into a plurality of times of operations in one frame period (1F), that is, in a time required to display video information for one screen of the display panel 20.

As illustrated in FIG. 26, when a control signal (TS-VD) is turned ON (to a high level), one frame period (1F) starts. A control signal (TS-HD) is repeatedly turned ON (high level) and OFF (low level) in one frame period (1F). The touch detection operation or the force detection operation is performed in a period when the control signal (TS-HD) is ON, and the display operation is performed in a period when the control signal (TS-HD) is OFF. The control signal (TS-VD) and the control signal (TS-HD) are output based on the clock signal of the clock signal generator of the controller 11 (refer to FIG. 1). One frame period (1F) consists of a plurality of display operation periods $Pd_x$ (x=1, 2, . . . , n), a plurality of touch detection periods $Pt_x$ (x=1, 2, . . . , m) of performing the touch detection operation, and a plurality of force detection periods $Pf_1$, $Pf_2$, and $Pf_3$ of performing the force detection operation. These periods are alternately arranged on the time axis in the following manner: the force detection period $Pf_1$, the display operation period $Pd_1$, the touch detection period $Pt_1$, the display operation period $Pd_2$, the touch detection period $Pt_e$, the display operation period $Pd_3$, . . . .

The controller 11 supplies the pixel signals Vpix through the gate driver 12 and the source driver 13 to the pixels Pix (refer to FIG. 17) in a plurality of rows selected in each of the display operation periods $Pd_x$. FIG. 26 illustrates a selection signal (SELR/G/B) for selection from the three colors of R, G, and B and a video signal (SIGn) for each color. According to the selection signal (SELR/G/B) corresponding one of the sub-pixels SPix is selected, and the video signal (SIGn) for each color is supplied to the selected sub-pixel SPix so as to perform the display operation of an image. An image obtained by dividing the video signal Vdisp for one screen into n pieces is displayed in each of the display operation periods $Pd_x$, and the video information for one screen is displayed in the display operation periods $Pd_1$, $Pd_2$, . . . , $Pd_n$. Since the drive electrodes COML serve also as the common electrodes of the display panel 20, the first drive electrode driver 14 supplies the first drive signal Vcom serving as the common potential for display driving to a selected one of the drive electrodes COML in each of the display operation periods $Pd_x$.

The controller 11 outputs the control signal to the first drive electrode driver 14 in the touch detection periods $Pt_x$ (x=1, 2, . . . , m). The first drive electrode driver 14 supplies the first drive signal Vcom for touch detection to the drive electrodes COML. The detector 40 calculates whether a touch input is applied to the display area 10a and, if so, the coordinates of the input position, from the first detection signal Vdet1 supplied from the detection electrodes TDL, based on the basic principle of the mutual capacitance touch detection described above.

In the touch detection periods $Pt_x$, the scan signal lines GCL and the pixel signal lines SGL (refer to FIG. 17) may be placed in the floating state where no voltage signal is supplied thereto and the potential thereof is not fixed. The scan signal lines GCL and the pixel signal lines SGL may be supplied with signals that have the same waveform and are synchronized with the first drive signal Vcom. This restrains capacitive coupling between the drive electrodes COML and the pixel signal lines GCL and capacitive coupling between the drive electrodes COML and the pixel signal lines SGL, and thus reduces the parasitic capacitances, so that lowering of the detection sensitivity in the touch detection can be reduced.

In the force detection periods $Pf_1$, $Pf_2$, and $Pf_3$, the controller 11 outputs the control signal to the second drive electrode driver 48. The second drive electrode driver 48 supplies the second drive signal Vd to the drive electrodes COML. The second drive electrode driver 48 also supplies the DC voltage signal Vdc to the wire 23. The detector 40 calculates the force input to the input surface 101a (refer, for example, to FIG. 11), from the second detection signal Vdet2 supplied from the drive electrodes COML, based on the detection principle of the self-capacitance method described above. In the force detection periods $Pf_1$, $Pf_2$, and $Pf_3$, the second drive electrode driver 48 may supply the guard signal Vsg1 to the wire 23, as will be describe later.

The force detection periods $Pf_1$, $Pf_2$, and $Pf_3$ are arranged as different periods from the touch detection periods $Pt_x$ and the display operation periods $Pd_x$. As a result, even if the drive electrodes COML are used as detection electrodes for force detection in the force detection periods $Pf_1$, $Pf_2$, and $Pf_3$, deterioration can be restrained, for example, in accuracy of the touch detection and in the displayed image. Even if the scan signal lines GCL are used also as the wire 23 and pixel signal lines SGL are used also as the auxiliary wire 51E, the TFT elements Tr are turned OFF in the force detection periods $Pf_1$, $Pf_2$, and $Pf_3$, so that, for example, the displayed image can be restrained from deteriorating.

All the detection operations from Detection 1 to Detection 3 illustrated in FIGS. 22A to 22C may be performed in one of the force detection periods $Pf_1$, $Pf_2$, and $Pf_3$. Alternatively, each of the detections may be separately performed, for example, as follows: Detection 1 is performed in the force detection period $Pf_1$; Detection 2 in the force detection period $Pf_2$; and Detection 3 in the force detection period $Pf_3$. Although the force detection periods $Pf_1$, $Pf_2$, and $Pf_3$ are provided by being divided into the three periods in one frame period (1F), each of the force detection periods $Pf_1$, $Pf_2$, and $Pf_3$ only needs to be provided at least once, or may be provided four times or more, in one frame period (1F). The arrangement of the force detection periods $Pf_1$, $Pf_2$, and $Pf_3$ in one frame period (1F) may be changed. For example, the force detection periods $Pf_1$, $Pf_2$, and $Pf_3$ may be arranged so as to come after all the touch detection periods $Pt_x$.

Figure 27:
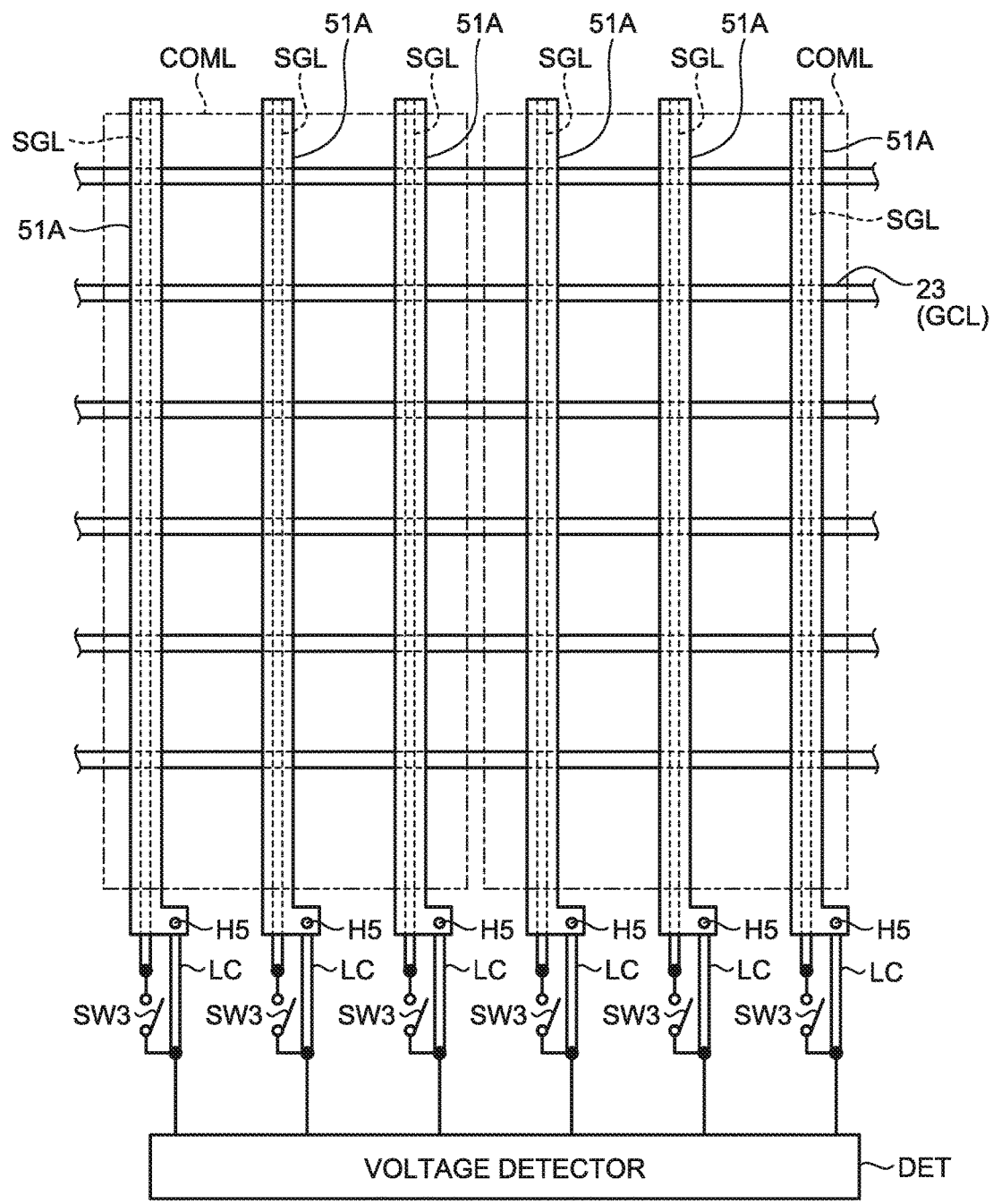
FIG. 27 is a schematic plan view illustrating an enlarged view of the drive electrodes and the detection wiring according to the first embodiment.

The following describes an example of a connection structure of the detection wire 51A. FIG. 27 is a schematic plan view illustrating an enlarged view of the drive electrodes and the detection wiring according to the first embodiment. Although FIG. 27 does not illustrate the detection wire 51B and the auxiliary wires 51C, 51D, and 51E described above, the detection wire 51B and the auxiliary wires 51C, 51D, and 51E can naturally be provided.

The detection wire 51A extends in the same direction as the extending direction of the pixel signal line SGL so as to overlap the pixel signal line SGL. The detection wire 51A is provided at a different layer from the pixel signal line SGL. The detection wire 51A is coupled on one end side thereof (in a position thereof closer to the voltage detector DET) to connection wire LC through a contact hole H5, and one end side of the connection wire LC is coupled to the voltage detector DET. One end side of the connection wire LC is coupled to the pixel signal line SGL through a switch SW3.

The switch SW3 is supplied with, for example, a control signal in phase with the control signal (TS-HD) illustrated in FIG. 26, and is turned ON or OFF in the display operation periods $Pd_x$ and the periods (touch detection periods $Pt_x$ and force detection periods $Pf_1$, $Pf_2$, and $Pf_3$) for stopping the display operation. The switch SW3 is, for example, turned ON when the control signal is at the high level, and turned OFF when the control signal is at the low level.

In the present embodiment, the control signal is set to the low level and the switch SW3 is turned OFF in the display operation periods $Pd_x$. This operation decouples the pixel signal line SGL from the detection wire 51A. The pixel signal lines SGL is supplied with the pixel signal Vpix from the source driver 13, and the drive electrode COML is supplied with the first drive signal Vcom for display.

The control signal is set to the high level and the switch SW3 is turned ON in the touch detection periods $Pt_x$ and the force detection periods $Pf_1$, $Pf_2$, and $Pf_3$. This operation couples the pixel signal lines SGL to the detection wire 51A. Since the detection wire 51A is in contact with the drive electrode COML, the pixel signal line SGL is electrically coupled to the drive electrode COML through the detection wire 51A.

As a result, the same signal as the first drive signal Vcom or the second drive signal Vd supplied to the drive electrode COML is supplied to the pixel signal line SGL. The pixel signal line SGL is driven by the signal having the same potential as that of the drive electrode COML, so that the parasitic capacitance generated between the drive electrode COML and the pixel signal line SGL can be reduced. Consequently, the lowering of the detection sensitivity of the touch detection and the force detection can be reduced.

The drive electrodes COML are made of the light-transmitting electrically conductive material, such as ITO, and thus have a higher resistance than the pixel signal lines SGL made of a metallic material. In the present embodiment, the drive electrodes COML are driven in the state electrically coupled to the pixel signal lines SGL, so that the apparent resistance value of the drive electrodes COML (combined resistance value of the pixel signal lines SGL and the drive electrodes COML) is reduced. As a result, power consumption can be reduced. The reduction in the apparent resistance value allows the drive electrodes COML to be driven by signals having a waveform with a good responsiveness to the first drive signal Vcom or the second drive signal Vd.

In FIG. 27, three detection wires 51A and three pixel signal lines SGL are provided for each of the drive electrodes COML. However, the numbers of detection wires 51A and pixel signal lines SGL may be each four or larger, or may be each one or two.

Second Embodiment

Figure 28:
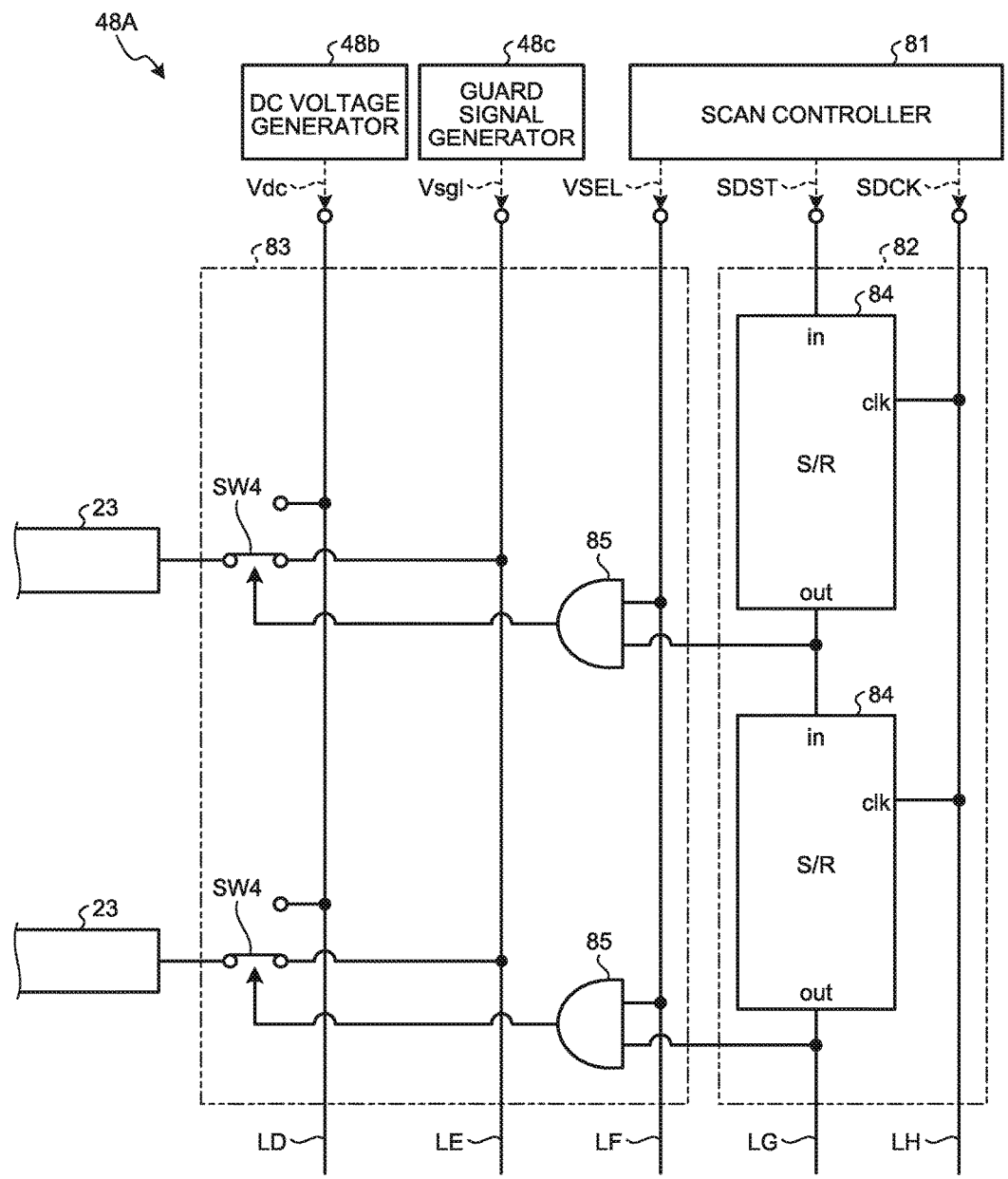
FIG. 28 is a block diagram illustrating a second drive electrode driver of a display device with a touch detection function according to a second embodiment of the present invention.

FIG. 28 is a block diagram illustrating a second drive electrode driver of a display device with a touch detection function according to a second embodiment. As illustrated in FIG. 28, this second drive electrode driver 48A includes the DC voltage generator 48b, a guard signal generator 48c, a scan controller 81, a scanning unit 82, and a driver 83. The scanning unit 82 is a circuit that performs scanning so as to select wires 23 to be driven from all the wires 23. The driver 83 is a circuit that supplies the DC voltage signal Vdc or the guard signal Vsg1 to the wire 23 based on scan signals supplied from the scanning unit 82. Although FIG. 28 illustrates two of the wires 23 so as to be easily viewed, the scanning unit 82 and the driver 83 are coupled to the three or more wires 23 illustrated in FIG. 15.

The scanning unit 82 and the driver 83 are provided in the frame area 10b of the first substrate 21 (refer to FIG. 15). The scan controller 81 is mounted on the touch detection IC 18 (refer to FIG. 16). The DC voltage generator 48b and the guard signal generator 48c may be mounted on the touch detection IC 18, or mounted in the frame area 10b of the first substrate 21. The second drive signal generator 15 (refer to FIG. 20) may be used also as the guard signal generator 48c.

The scan controller 81 supplies a control signal SDCK and a scan start signal SDST to the scanning unit 82 based on the control signal from the controller 11. The scanning unit 82 includes shift registers (S/R) 84 that generate the scan signals for selecting and scanning the wire 23. The shift registers 84 are supplied with the scan start signal SDST from the scan controller 81 through a wire LG, and starts scanning triggered by the scan start signal SDST. The shift registers 84 are supplied with the control signal SDCK serving as a reference clock signal through a wire LH. The scan start signal SDST is sequentially transferred at respective transfer stages of the shift registers 84 in synchronization with the control signal SDCK so as to sequentially or simultaneously select the shift registers 84. The selected shift registers 84 output the scan signals to the driver 83.

The driver 83 includes AND circuits 85, switches SW4, and power supply wires LD and LE. The power supply wire LD is supplied with the DC voltage signal Vdc from the DC voltage generator 48b. The power supply wire LE is supplied with the guard signal Vsg1 from the guard signal generator 48c. The AND circuits 85 and the switches SW4 are provided for the respective wires 23. Each of the AND circuits 85 generates a logical product (AND) of a scan signal supplied from corresponding one of the shift registers 84 and a selection signal VSEL supplied from the scan controller 81 through the wire LF, and outputs the result. Each of the switches SW4 performs switching between a connection of the wire 23 to the power supply wire LD and a connection of the wire 23 to the supply wire LE.

The AND circuit 85 outputs a high-level signal when the scan signal is supplied from the shift register 84 and the selection signal VSEL is ON (at a high level). The AND circuit 85 outputs a low-level signal when the scan signal is not supplied from the shift register 84 or the selection signal VSEL is OFF (at a low level).

When the high-level signal is supplied from the AND circuit 85, the switch SW4 couples the wire 23 to the power supply wire LD, and decouples the wire 23 from the power supply wire LE. This operation causes the DC voltage signal Vdc to be supplied to the wires 23 selected as wires to be driven. When, in contrast, the low-level signal is supplied from the AND circuit 85, the switch SW4 couples the wire 23 to the power supply wire LE, and decouples the wire 23 from the power supply wire LD. This operation causes the guard signal Vsg1 to be supplied to the wires 23 not selected as wires to be driven. The circuit diagram of the scanning unit 82 and the driver 83 illustrated in FIG. 28 is merely an example. The circuit configuration may be changed as appropriate.

Figure 29A:
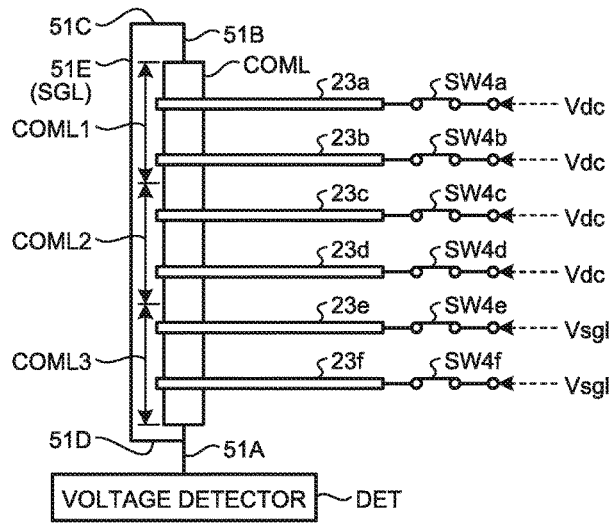
FIGS. 29A to 29C are explanatory diagrams for explaining operation examples of the force detection according to the second embodiment.
Figure 29B:
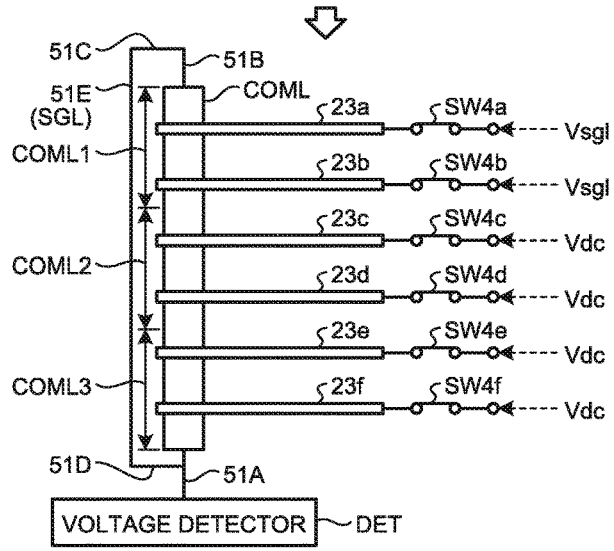
Figure 29C:
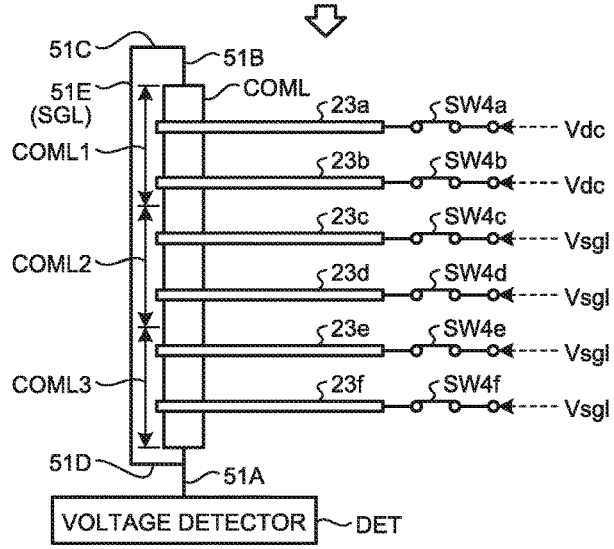

FIGS. 29A to 29C are explanatory diagrams for explaining operation examples of the force detection according to the second embodiment. In the present embodiment, switches SW4a to SW4f are coupled to the wires 23a to 23f, respectively. As described above, the wires 23a to 23f are supplied with the DC voltage signal Vdc or the guard signal Vsg1 depending on the switching of connections of the switches SW4a to SW4f of the second drive electrode driver 48A. In the first embodiment, the wires 23 not selected as wires to be driven are placed in the floating state. The present embodiment differs from the first embodiment in that the wires 23 not selected as wires to be driven are supplied with the guard signal Vsg1. FIGS. 29A to 29C are a simplified illustrations of connection configurations of the switches SW4a to SW4f.

In Detection 1 illustrated in FIG. 29A, the wires 23a to 23d are selected as wires to be driven, so that the DC voltage signal Vdc is supplied thereto through the switches SW4a to SW4d. This increases the parasitic capacitances between the drive electrode COML in the first and second regions COML1 and COML2 and the wires 23a to 23d. The wires 23e and 23f are not selected as wires to be driven, so that the guard signal Vsg1 is supplied thereto through the switches SW4e and SW4f. As a result, the drive electrode COML in the third region COML3 and the wires 23e and 23f are driven at the same potential, and the parasitic capacitances therebetween are smaller than those in the case of the floating state.

The output waveforms in the respective regions exhibit the same trends as the waveforms illustrated in FIGS. 23A to 23C. In the present embodiment, the parasitic capacitance by the drive electrode COML in the third region COML3 is smaller, so that the responsiveness thereof to the second drive signal Vd is better, and the detection sensitivity thereof is improved. The relations between the pressed position and the output signal levels are the same as those illustrated in FIG. 24. That is, in Detection 1, the signal level of the second detection signal Vdet2A output from the voltage detector DET is at the low level (Low) when the pressed position is in the first region COML1 or the second region COML2, and the signal level of the second detection signal Vdet2A is at the high level (High) when the pressed position is in the third region COML3. Thus, the force applied to the third region COML3 is selectively detected in Detection 1.

In Detection 2, as illustrated in FIG. 29B, the wires 23c to 23f are selected as wires to be driven, so that the DC voltage signal Vdc is supplied thereto through the switches SW4c to SW4f. This increases the parasitic capacitances between the drive electrode COML in the second and third regions COML2 and COML3 and the wires 23c to 23f. The wires 23a and 23b are not selected as wires to be driven, so that the guard signal Vsg1 is supplied thereto through the switches SW4a and SW4b. As a result, the parasitic capacitances between the drive electrode COML in the first region COML1 and the wires 23a and 23b are smaller than those in the case of the floating state.

In Detection 2, the parasitic capacitance by the drive electrode COML in the first region COML1 is smaller, so that the responsiveness thereof to the second drive signal Vd is better, and the detection sensitivity thereof is improved. The signal level of the second detection signal Vdet2B is at the high level (High) when the pressed position is in the first region COML1. When the pressed position is in the second region COML2 or the third region COML3, the signal level of the second detection signal Vdet2B is at the low level (Low). Thus, the force applied to the first region COML1 is selectively detected in Detection 2.

In Detection 3, as illustrated in FIG. 29C, the wires 23a and 23b are selected as wires to be driven, so that the DC voltage signal Vdc is supplied thereto through the switches SW4a and SW4b. This increases the parasitic capacitances between the drive electrode COML in the first region COML1 and the wires 23a and 23b. The wires 23c to 23f are not selected as wires to be driven, so that the guard signal Vsg1 is supplied thereto through the switches SW4c to SW4f. As a result, the parasitic capacitances between the drive electrode COML in the second and third regions COML2 and COML3 and the wires 23c to 23f are smaller than those in the case of the floating state.

In Detection 3, parasitic capacitances by the drive electrode COML in the second and third regions COML2 and COML3 are smaller, so that the responsiveness thereof to the second drive signal Vd is better, and the detection sensitivity thereof is improved. In Detection 3, the signal level of the second detection signal Vdet2C is at the low level (Low) when the pressed position is in the first region COML1. When the pressed position is in the second region COML2 or the third region COML3, the signal level of the second detection signal Vdet2C is at the high level (High). The coordinate extractor 45 receives the information obtained in Detections 1 to 3 from the storage unit 47, and calculates the difference (Vdet2C−Vdet2A) between the information on the second detection signal Vdet2C obtained in Detection 3 and the information on the second detection signal Vdet2A obtained in Detection 1. As a result of this calculation, if the pressed position is in the second region COML2, the difference (Vdet2C−Vdet2A) is calculated to be at the high level (High), and thus, the force applied to the second region COML2 can be detected.

The guard signal Vsg1 preferably has a waveform having the same amplitude and the same frequency as those of the second drive signal Vd. The guard signal Vsg1 is not limited to having such a waveform, but may have a waveform having amplitude different from that of the second drive signal Vd.

Figure 30:
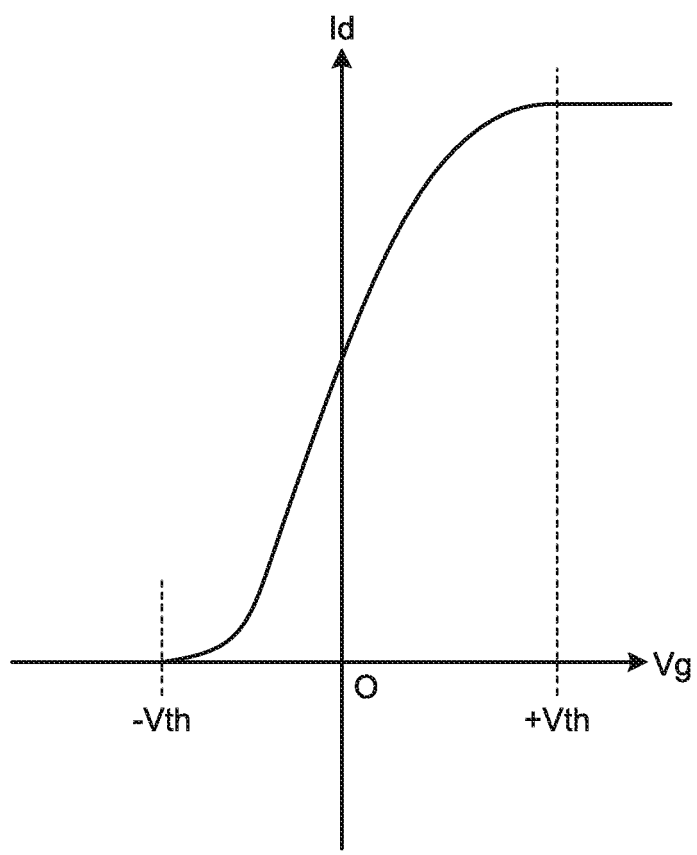
FIG. 30 is a graph schematically illustrating a relation between a gate voltage and a drain current of a switching element.

FIG. 30 is a graph schematically illustrating a relation between a gate voltage and a drain current of a switching element. As illustrated in FIG. 30, the TFT element Tr serving as the switching element (refer to FIG. 17) is turned ON and a drain current Id flows when a gate voltage Vg thereof is higher than a voltage −Vth. When the gate voltage Vg is equal to or lower than the voltage −Vth, the TFT element Tr is turned OFF and the drain current stops flowing. The voltage −Vth illustrated in FIG. 30 serves as an OFF potential of the TFT element Tr.

In the present embodiment, the wire 23 is also used as the scan signal lines GCL as described above. Therefore, the DC voltage signal Vdc and the guard signal Vsg1 supplied to the wire 23 are preferably signals having lower potentials than the OFF potential −Vth. In the same manner as the second drive signal Vd, the guard signal Vsg1 is an alternating-current signal in which the potential shifts between a high-level potential and a low-level potential. The high-level potential is preferably lower than the OFF potential −Vth.

This keeps the TFT element Tr in the OFF state even when the DC voltage signal Vdc or the guard signal Vsg1 is supplied to the pixel signal line SGL. Consequently, in the touch detection periods $Pt_x$ and the force detection periods $Pf_1$, $Pf_2$, and $Pf_3$, the TFT element Tr is restrained from turning ON to cause leakage, thus restraining the display quality from deteriorating.

Third Embodiment

Figure 31:
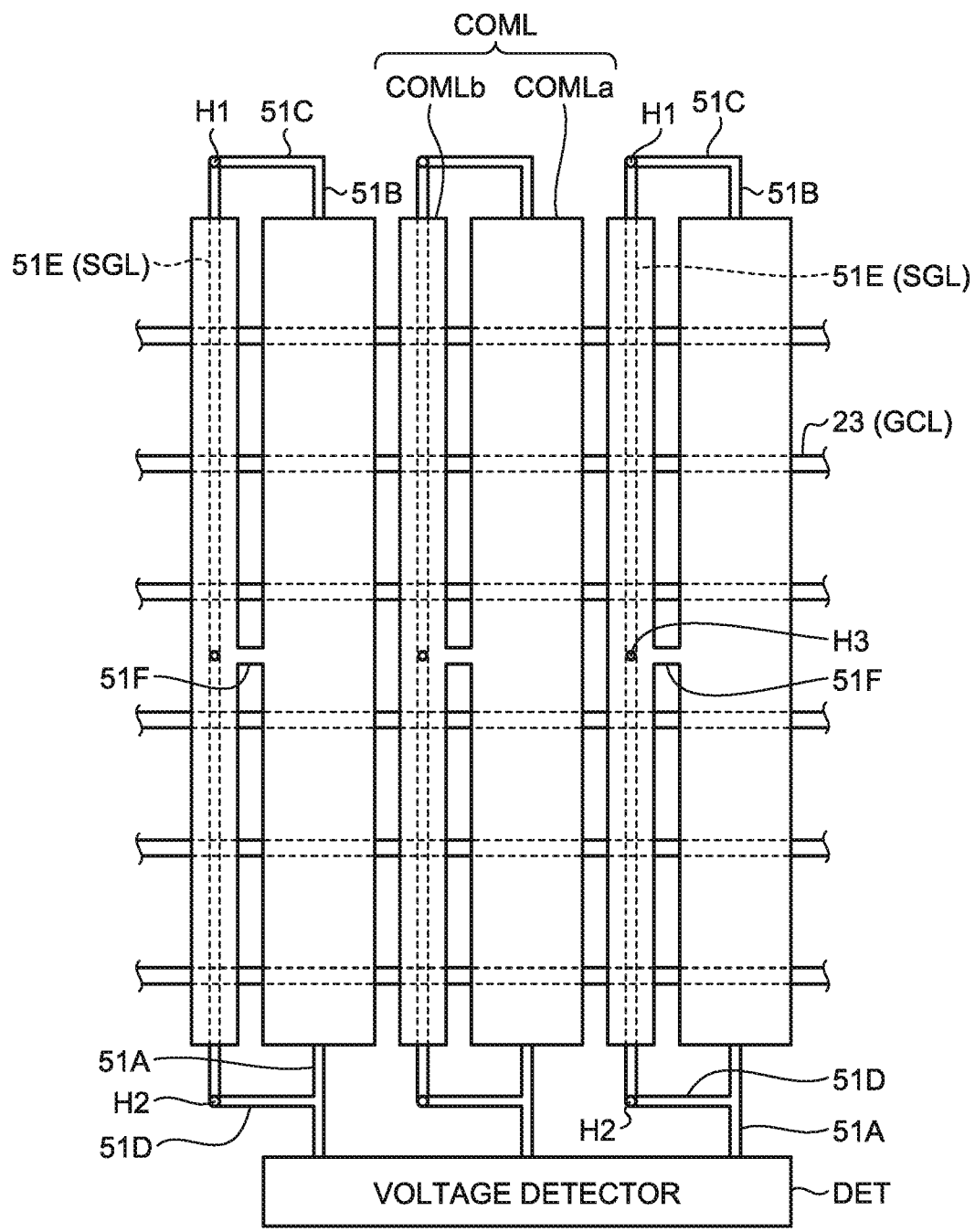
FIG. 31 is a schematic plan view illustrating an enlarged view of the drive electrodes and detection wiring of a display device with a touch detection function according to a third embodiment of the present invention.

FIG. 31 is a schematic plan view illustrating an enlarged view of the drive electrodes and detection wiring of a display device with a touch detection function according to a third embodiment. In the present embodiment, auxiliary wiring 51F is provided that couples the drive electrode COMLa for detection use to the drive electrode COMLb for dummy use. The auxiliary wires 51C, 51D, and 51F are provided at the same layer as the detection wires 51A and 51B, and extend in the direction intersecting the detection wire 51A. The auxiliary wire 51C couples the detection wire 51B to one end side of the auxiliary wire 51E. The auxiliary wire 51D couples the detection wire 51A to the other end side of the auxiliary wire 51E. The auxiliary wire 51F couples a central part in the extending direction of the drive electrode COMLa for detection use to a central part in the extending direction of the drive electrode COMLb for dummy use. The drive electrode COMLb for dummy use is couples to the auxiliary wire 51E through a contact hole H3.

With the configuration described above, the drive electrode COML is supplied with the second drive signal Vd from one end side thereof through the detection wire 51A, is also supplied with the second drive signal Vd from the other end side thereof through the detection wire 51B and the auxiliary wires 51C, 51D, and 51E, and is further supplied with the second drive signal Vd from the central part thereof through the auxiliary wiring 51F. As a result, the second drive signal Vd can be supplied to the entire drive electrode COML even when the time constant τ of the drive electrodes COML is increased by the supply of the DC voltage signal Vdc to the wire 23.

Figure 33A:
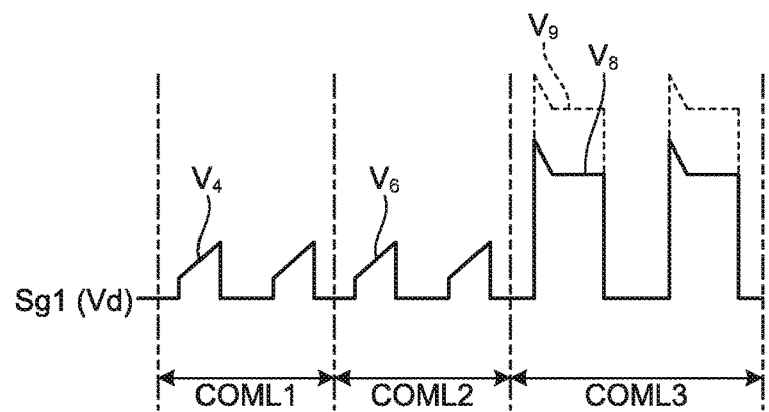
FIGS. 33A to 33C are diagrams schematically illustrating the output waveforms of the respective regions of the drive electrodes.
Figure 33B:
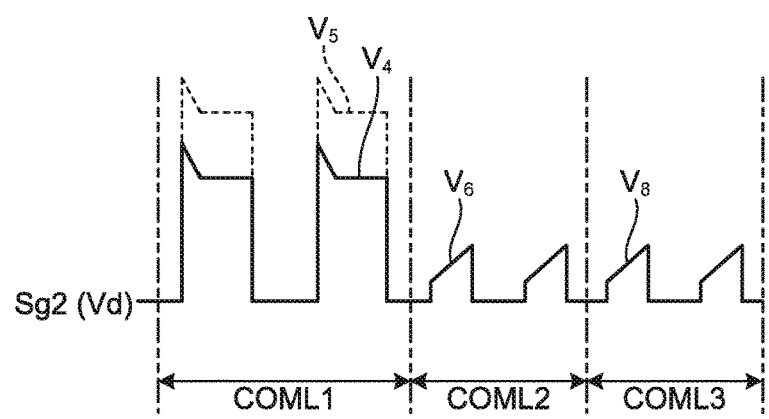
Figure 33C:
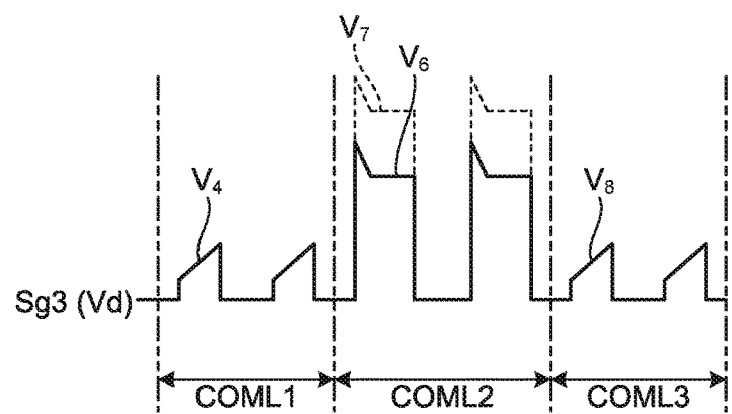

FIGS. 32A to 32C are explanatory diagrams for explaining operation examples of the force detection by the display device with a touch detection function according to the third embodiment. FIGS. 33A to 33C are diagrams schematically illustrating the output waveforms of the respective regions of the drive electrodes. FIG. 34 is a table illustrating relations between the pressed position and the output signal levels obtained as respective detection results.

In Detection 1 illustrated in FIG. 32A, the wires 23a to 23d are selected as wires to be driven, so that the DC voltage signal Vdc is supplied thereto through the switches SW4a to SW4d. This increases the parasitic capacitances between the drive electrode COML in the first and second regions COML1 and COML2 and the wires 23a to 23d. The wires 23e and 23f are not selected as wires to be driven, so that the guard signal Vsg1 is supplied thereto through the switches SW4e and SW4f. As a result, the drive electrode COML in the third region COML3 and the wires 23e and 23f are driven at the same potential, and the parasitic capacitances therebetween are reduced.

The parasitic capacitances are large between the drive electrode COML in the first and second regions COML1 and COML2 and the wires 23a to 23d, so that the waveforms $V_4$ and $V_6$ in the first and second regions COML1 and COML2 have small amplitudes, as illustrated in FIG. 33A. In contrast, the wires 23e and 23f are supplied with the guard signal Vsg1, so that the waveform $V_8$ has a larger amplitude than the waveforms $V_4$ and $V_6$. Consequently, when force is applied to the third region COML3, the waveform $V_9$ indicated by a dotted line is output based on the detection principle of the self-capacitance method described above.

As illustrated in TABLE 2 of FIG. 34, in Detection 1, the signal level of the second detection signal Vdet2A is at the low level (Low) when the pressed position is in the first region COML1 or the second region COML2, and the signal level of the second detection signal Vdet2A is at the high level (High) when the pressed position is in the third region COML3. Thus, the force applied to the third region COML3 is selectively detected in Detection 1.

In Detection 2 illustrated in FIG. 32B, the wires 23c to 23f are selected as wires to be driven, so that the DC voltage signal Vdc is supplied thereto through the switches SW4c to SW4f. This increases the parasitic capacitances between the drive electrode COML in the second and third regions COML2 and COML3 and the wires 23c to 23f. The wires 23a and 23b are not selected as wires to be driven, so that the guard signal Vsg1 is supplied thereto through the switches SW4a and SW4b. As a result, the drive electrode COML in the first region COML1 and the wires 23a and 23b are driven at the same potential, and the parasitic capacitances therebetween are reduced.

The parasitic capacitances are large between the drive electrode COML in the second and third regions COML2 and COML3 and the wires 23c to 23f, so that the waveforms $V_6$ and $V_8$ in the second and third regions COML2 and COML3 have small amplitudes, as illustrated in FIG. 33B. In contrast, the wires 23a and 23b are supplied with the guard signal Vsg1, so that the waveform $V_4$ has a larger amplitude than the waveforms $V_6$ and $V_8$. Consequently, when force is applied to the first region COML1, the waveform $V_5$ indicated by a dotted line is output based on the detection principle of the self-capacitance method described above.

As illustrated in TABLE 2 of FIG. 34, in Detection 2, the signal level of the second detection signal Vdet2B is at the low level (Low) when the pressed position is in the second region COML2 or the third region COML3, and the signal level of the second detection signal Vdet2B is at the high level (High) when the pressed position is in the first region COML1. Thus, the force applied to the first region COML1 is selectively detected in Detection 2.

In Detection 3 illustrated in FIG. 32C, the wires 23a, 23b, 23e, and 23f are selected as wires to be driven, so that the DC voltage signal Vdc is supplied thereto through the switches SW4a, SW4b, SW4e, and SW4f. This increases the parasitic capacitances between the drive electrode COML in the first region COML1 and the wires 23a and 23b and the parasitic capacitances between the drive electrode COML in the third region COML3 and the wires 23e and 23f. The wires 23c and 23d are not selected as wires to be driven, so that the guard signal Vsg1 is supplied thereto through the switches SW4c and SW4d. As a result, the drive electrode COML in the second region COML2 and the wires 23c and 23d are driven at the same potential, and the parasitic capacitances therebetween are reduced.

The parasitic capacitances are large between the drive electrode COML in the first and third regions COML1 and COML3 and the wires 23a, 23b, 23e, and 23f, so that the waveforms $V_4$ and $V_8$ in the first and third regions COML1 and COML3 have small amplitudes, as illustrated in FIG. 33C. In contrast, the wires 23c and 23d are supplied with the guard signal Vsg1, so that the waveform $V_6$ has a larger amplitude than the waveforms $V_4$ and $V_8$. Consequently, when force is applied to the second region COML2, the waveform $V_7$ indicated by a dotted line is output based on the detection principle of the self-capacitance method described above.

As illustrated in TABLE 2 of FIG. 34, in Detection 3, the signal level of the second detection signal Vdet2C is at the low level (Low) when the pressed position is in the first region COML1 or the third region COML3, and the signal level of the second detection signal Vdet2C is at the high level (High) when the pressed position is in the second region COML2. Thus, the force applied to the second region COML2 is selectively detected in Detection 3.

In the present embodiment, the second drive signal Vd is supplied also from the central part of the drive electrode COML through the auxiliary wire 51F. As a result, the second drive signal Vd can be supplied to the second region COML2 at the central part even when the parasitic capacitances in the first and third regions COML1 and COML3 on both sides of the drive electrode COML are increased by the supply of the DC voltage signal Vdc to the wires 23a, 23b, 23e, and 23f, as illustrated in FIG. 32C. Consequently, the detection accuracy can be improved. In Detection 3, the force applied to the second region COML2 is selectively detected, so that the calculation by the coordinate extractor 45 can be omitted.

Fourth Embodiment

Figure 35A:
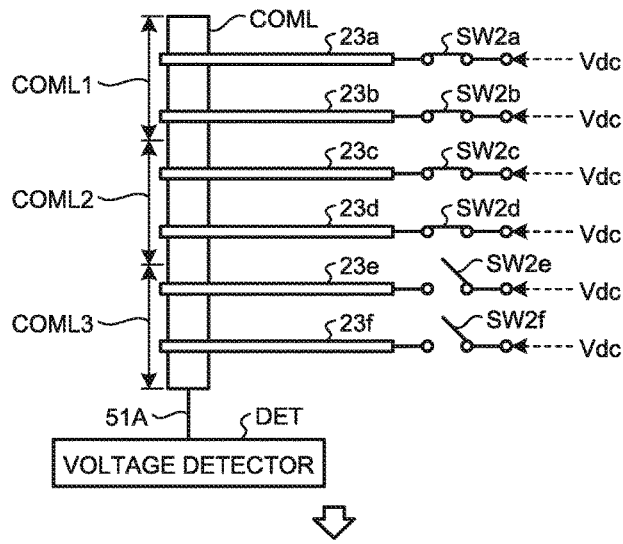
FIGS. 35A to 35C are explanatory diagrams for explaining operation examples of the force detection by a display device with a touch detection function according to a fourth embodiment of the present invention.
Figure 35B:
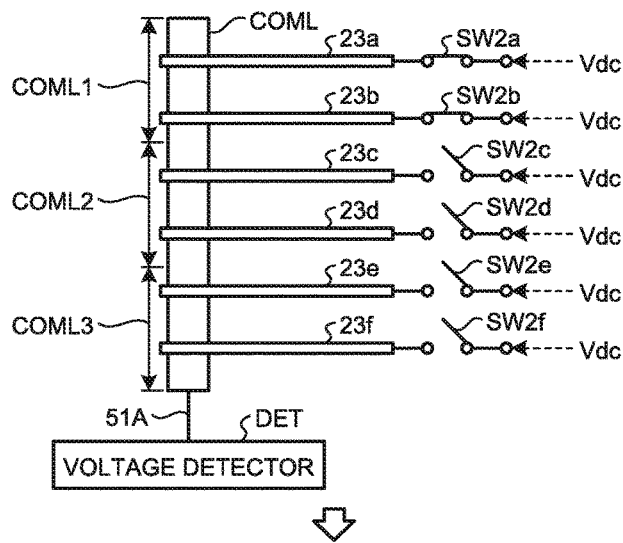
Figure 35C:
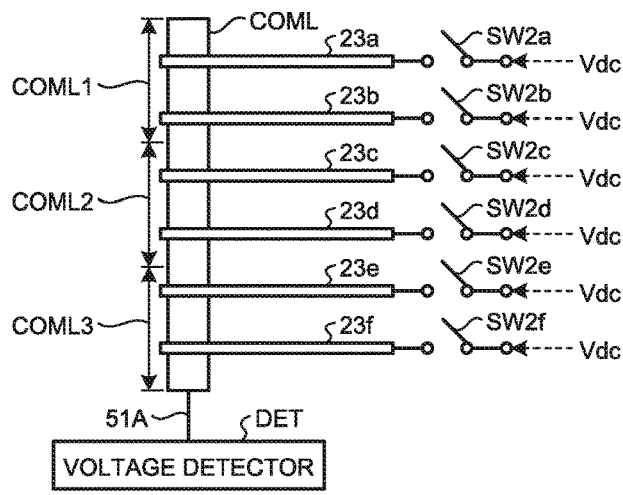
Figure 36A:
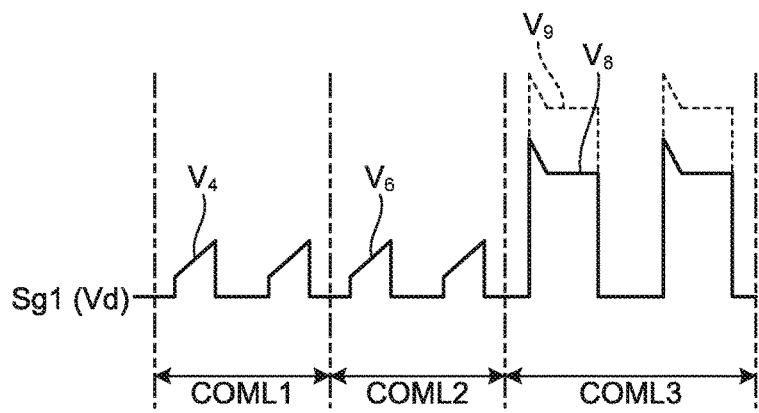
FIGS. 36A to 36C are diagrams schematically illustrating the output waveforms of the respective regions of the drive electrodes.
Figure 36B:
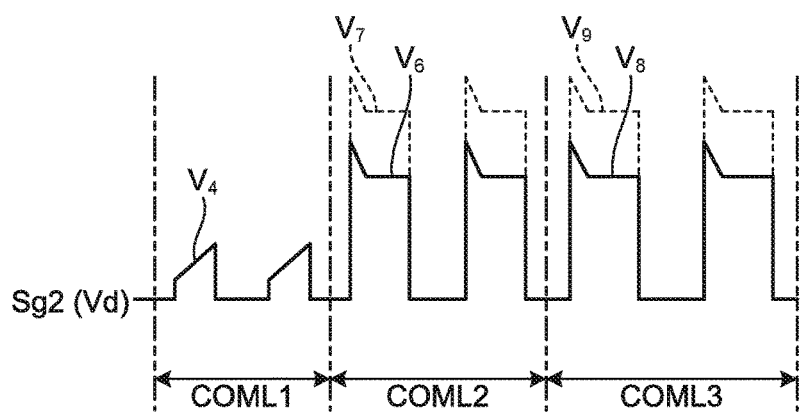
Figure 36C:
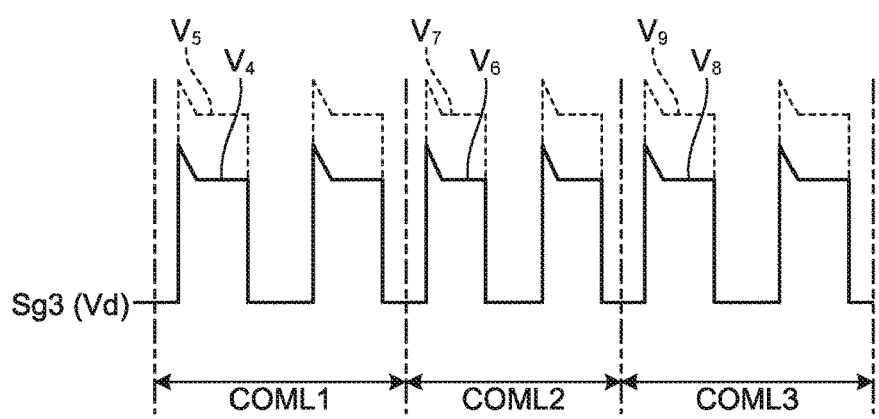

FIGS. 35A to 35C are explanatory diagrams for explaining operation examples of the force detection by a display device with a touch detection function according to a fourth embodiment. FIGS. 36A to 36C are diagrams schematically illustrating the output waveforms of the respective regions of the drive electrodes. FIG. 37 is a table illustrating relations between the pressed position and the output signal levels obtained as respective detection results and calculation results.

In the present embodiment, the detection wire 51B and the auxiliary wires 51C, 51D, 51E, and 51F described above are not provided. That is, the second drive signal Vd is supplied to the drive electrode COML from one end side thereof through the detection wire 51A, but is not supplied thereto from the other end side or the central part thereof.

In Detection 1 illustrated in FIG. 35A, the wires 23a to 23d are selected as wires to be driven, so that the DC voltage signal Vdc is supplied thereto through the switches SW2a to SW2d. This increases the parasitic capacitances between the drive electrode COML in the first and second regions COML1 and COML2 and the wires 23a to 23d. The wires 23e and 23f are not selected as wires to be driven, so that the switches SW2e and SW2f are turned OFF, and the wires 23e and 23f are placed in the floating state. This reduces the parasitic capacitances between the drive electrode COML in the third region COML3 and the wires 23e and 23f.

The parasitic capacitances are large between the drive electrode COML in the first and second regions COML1 and COML2 and the wires 23a to 23d, so that the waveforms $V_4$ and $V_6$ in the first and second regions COML1 and COML2 have small amplitudes, as illustrated in FIG. 36A. In contrast, the wires 23e and 23f are placed in the floating state, so that the waveform $V_8$ has a larger amplitude than the waveforms $V_4$ and $V_6$. Consequently, when force is applied to the third region COML3, the waveform $V_9$ indicated by a dotted line is output based on the detection principle of the self-capacitance method described above.

As illustrated in TABLE 3 of FIG. 37, in Detection 1, the signal level of the second detection signal Vdet2A is at the low level (Low) when the pressed position is in the first region COML1 or the second region COML2, and the signal level of the second detection signal Vdet2A is at the high level (High) when the pressed position is in the third region COML3. Thus, the force applied to the third region COML3 is selectively detected in Detection 1.

In Detection 2 illustrated in FIG. 35B, the wires 23a and 23b are selected as wires to be driven, so that the DC voltage signal Vdc is supplied thereto through the switches SW2a and SW2b. This increases the parasitic capacitances between the drive electrode COML in the first region COML1 and the wires 23a and 23b. The wires 23c to 23f are not selected as wires to be driven, so that the switches SW2c to SW2f are turned OFF, and the wires 23c to 23f are placed in the floating state. This reduces the parasitic capacitances between the drive electrode COML in the second and third regions COML2 and COML3 and the wires 23c to 23f.

The parasitic capacitances are large between the drive electrode COML in the first region COML1 and the wires 23a and 23b, so that the waveform $V_4$ in the first region COML1 has a small amplitude, as illustrated in FIG. 36B. In contrast, since the wires 23c to 23f are in the floating state, the waveforms $V_6$ and $V_8$ have larger amplitudes than of the waveform $V_4$. Consequently, when force is applied to the second region COML2 or the third region COML3, the waveform $V_7$ or $V_9$ indicated by a dotted line is output based on the detection principle of the self-capacitance method described above.

As illustrated in TABLE 3 of FIG. 37, in Detection 2, the signal level of the second detection signal Vdet2B is at the low level (Low) when the pressed position is in the first region COML1, and the signal level of the second detection signal Vdet2B is at the high level (High) when the pressed position is in the second region COML2 or the third region COML3. Thus, the result of Detection 2 indicates that the force applied to the second region COML2 or the third region COML3 is detected. In this case, the force applied to the second region COML2 is difficult to be distinguished from the force applied to the third region COML3.

In Detection 3 illustrated in FIG. 35C, the wires 23a to 23f are not selected as wires to be driven, so that the switches SW2a to SW2f are turned OFF, and the wires 23a to 23f are placed in the floating state. The DC voltage signal Vdc is not supplied to the wires 23a to 23f. This reduces the parasitic capacitances between the drive electrode COML in the first, second, and third regions COML1, COML2, and COML3 and the wires 23a to 23f.

Since the wires 23a to 23f are in the floating state, as illustrated in FIG. 36C, the waveforms $V_4$, $V_6$, and $V_8$ have larger amplitudes than the waveform in the case of the large parasitic capacitances illustrated in FIGS. 36A and 36B. Consequently, when force is applied to the first region COML1, the second region COML2, or the third region COML3, the waveform $V_5$, $V_7$, or $V_9$ indicated by a dotted line is output based on the detection principle of the self-capacitance method described above.

As illustrated in FIG. 37, in Detection 3, the signal level of the second detection signal Vdet2C is at the high level (High) in all the cases where the pressed position is in the first, second, and third regions COML1, COML2, and COML3. The result of Detection 3 indicates that the forces applied to the first, second, and third regions COML1, COML2, and COML3 cannot be distinguished from one another.

As illustrated in TABLE 3 of FIG. 37, in the present embodiment, the result of Detection 1 indicates that the force applied to the third region COML3 can be detected. The coordinate extractor 45 receives the information obtained in Detections 1 to 3 from the storage unit 47, and performs calculation. The coordinate extractor 45 calculates a difference (Vdet2B−Vdet2A) between the information on the second detection signal Vdet2B obtained in Detection 2 and the information on the second detection signal Vdet2A obtained in Detection 1 (Calculation 1). If the pressed position is in the second region COML2, the signal level differs between the second detection signal Vdet2A and the second detection signal Vdet2B, so that the signal level of the calculated difference (Vdet2B−Vdet2A) is at the high level. In this manner, the force applied to the second region COML2 can be detected by performing Calculation 1.

The coordinate extractor 45 calculates a difference (Vdet2C−Vdet2B) between the information on the second detection signal Vdet2B obtained in Detection 2 and the information on the second detection signal Vdet2C obtained in Detection 3 (Calculation 2). If the pressed position is in the first region COML1, the signal level differs between the second detection signal Vdet2B and the second detection signal Vdet2C, so that the signal level of the calculated difference (Vdet2C−Vdet2B) is at the high level. In this manner, the force applied to the first region COML1 can be detected by performing Calculation 2.

As described above, when the second drive signal Vd is supplied to the drive electrode COML from one end side thereof, the force applied to each of the first, second, and third regions COML1, COML2, and COML3 of the drive electrode COML can also be detected by detecting the force while sequentially changing the combination between wires 23 not selected as wires to be driven from all the wires 23 and wires 23 selected as wires to be driven from all the wires 23. Consequently, the position to which the force is applied can be detected in the extending direction of the drive electrode COML, so that the force can be accurately detected.

Fifth Embodiment

Figure 38A:
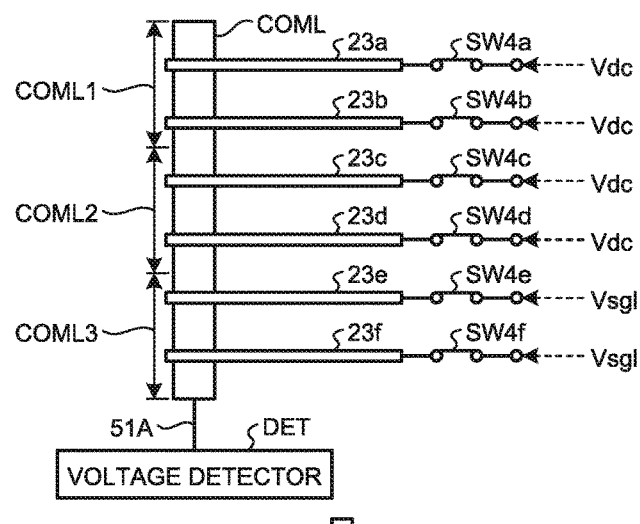
FIGS. 38A to 38C are explanatory diagrams for explaining operation examples of the force detection by a display device with a touch detection function according to a fifth embodiment of the present invention.
Figure 38B:
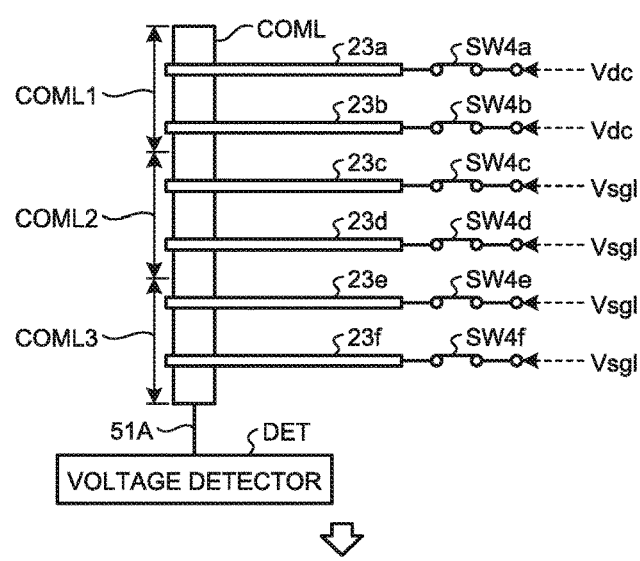
Figure 38C:
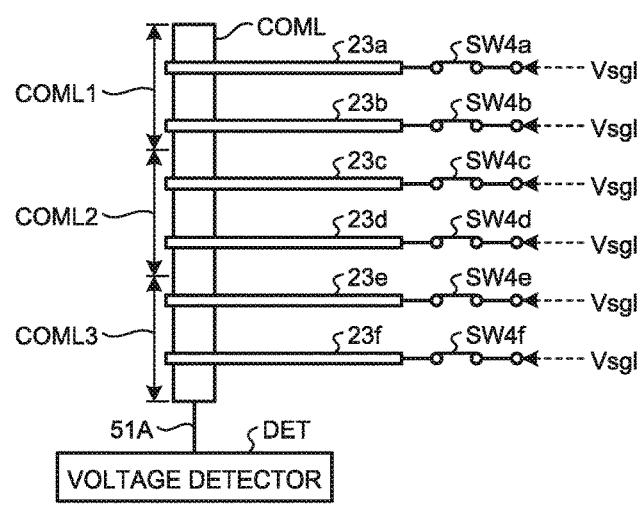

FIGS. 38A to 38C are explanatory diagrams for explaining operation examples of the force detection by a display device with a touch detection function according to a fifth embodiment. In the present embodiment, in the same manner as in the fourth embodiment, the second drive signal Vd is supplied to the drive electrode COML from one end side thereof through the detection wire 51A. In the fourth embodiment, the wires 23 not selected as wires to be driven are placed in the floating state. In the present embodiment, however, the wires 23 not selected as wires to be driven are supplied with the guard signal Vsg1.

As illustrated in FIG. 38A, in Detection 1, the guard signal Vsg1 is supplied to the wires 23e and 23f. As illustrated in FIG. 38B, in Detection 2, the guard signal Vsg1 is supplied to the wires 23c to 23f. As illustrated in FIG. 38C, in Detection 3, the guard signal Vsg1 is supplied to the wires 23a to 23f. The guard signal Vsg1 is supplied to the wires 23 not selected as wires to be driven among the wires 23a to 23f, so that the detection sensitivity of the force can be improved.

In Detections 1 to 3, the combinations between the wires 23 supplied with the DC voltage signal Vdc and the wires 23 supplied with the guard signal Vsg1 are the same as the combinations between the wires 23 supplied with the DC voltage signal Vdc and the wires 23 in the floating state in the fourth embodiment. Consequently, the relations between the pressed position and the output signal levels are the same as those illustrated in TABLE 3 of FIG. 37, so that the force applied to each of the first, second, and third regions COML1, COML2, and COML3 of the drive electrode COML can be detected based on the results obtained by Detections 1 to 3 and Calculations 1 and 2.

Sixth Embodiment

Figure 39:
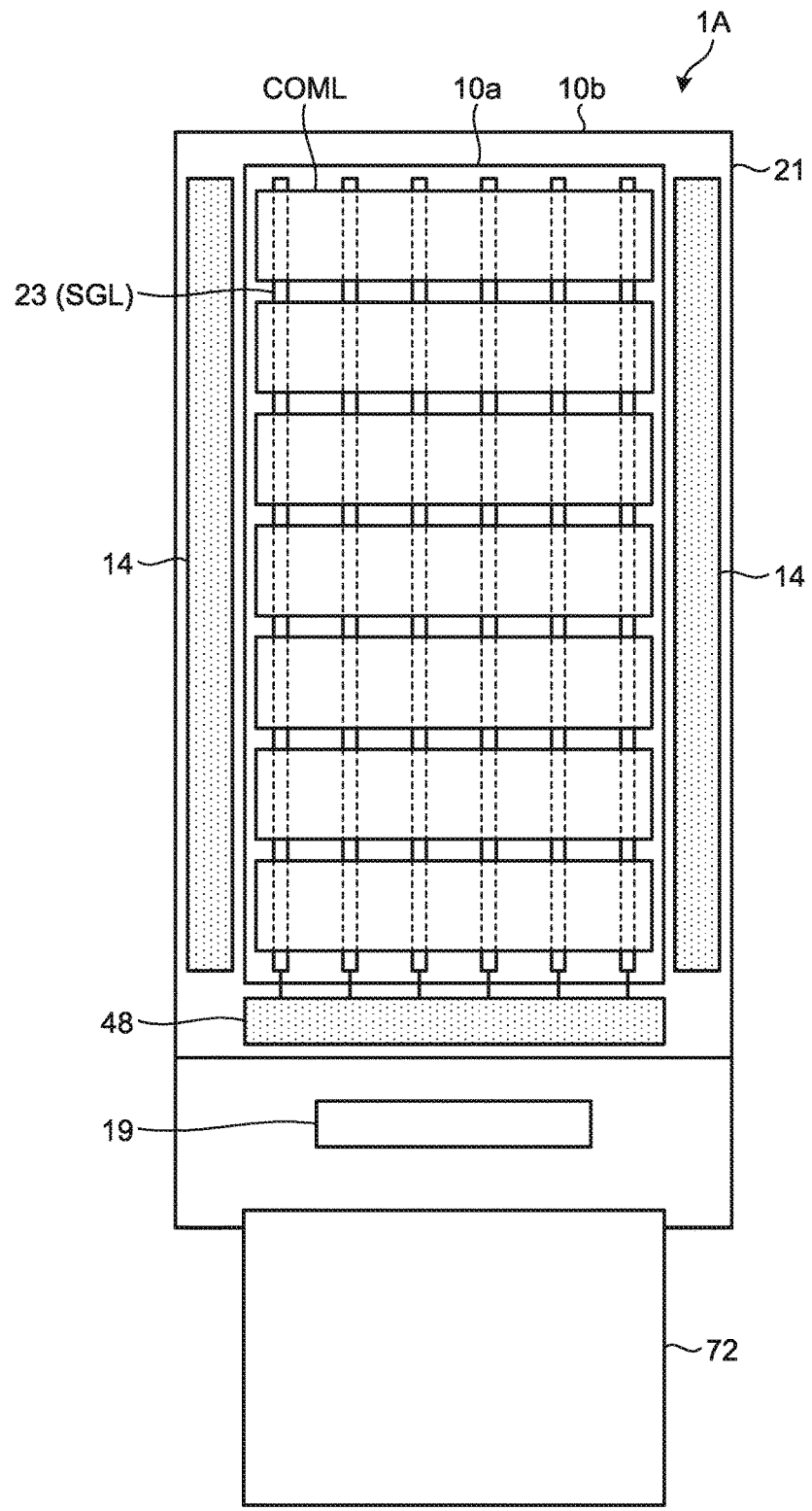
FIG. 39 is a plan view schematically illustrating a first substrate according to a sixth embodiment of the present invention.
Figure 40:
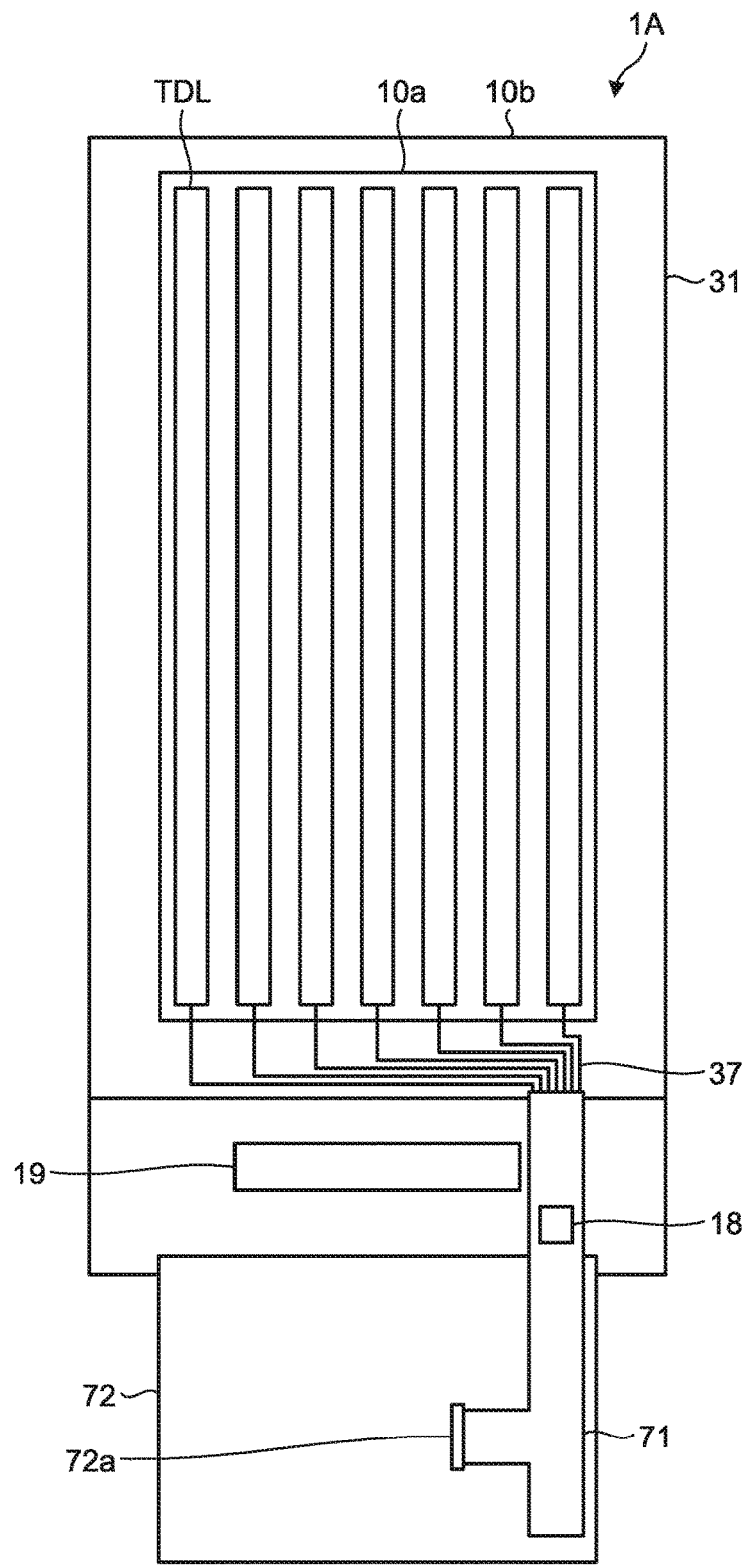
FIG. 40 is a plan view schematically illustrating a second substrate according to the sixth embodiment.

FIG. 39 is a plan view schematically illustrating a first substrate according to a sixth embodiment. FIG. 40 is a plan view schematically illustrating a second substrate according to the sixth embodiment. As illustrated in FIG. 39, in a display device with a touch detection function 1A of the present embodiment, the drive electrodes COML extend in the direction along the short sides of the display area 10a, and are arranged in the direction along the long sides of the display area 10a. In other words, the drive electrodes COML extend in the direction along the extending direction of the scan signal lines GCL (refer to FIG. 17), and are arranged in the extending direction of the pixel signal lines SGL (refer to FIG. 17).

The wires 23 extend in a direction intersecting the extending direction of the drive electrodes COML, and are arranged in the direction along the extending direction of the drive electrodes COML. The wires 23 are coupled to the second drive electrode driver 48. As described above, the selected wires 23 are supplied with the DC voltage signal Vdc, and the unselected wires 23 are placed in the floating state, or are supplied with the guard signal Vsg1. This configuration allows the drive electrodes COML to be divided into a plurality of regions in the extending direction thereof, so that the force can be accurately detected. The input position of the force in the arrangement direction of the drive electrodes COML can be detected by detecting the force to each of the drive electrodes COML.

As illustrated in FIG. 40, the detection electrodes TDL extend in the direction along the long sides of the display area 10a, and are arranged in the direction along the short sides of the display area 10a. Such a configuration enables the touch detection based on the basic principle of the mutual capacitance touch detection described above.

In the present embodiment, the pixel signal lines SGL are also used as the wire 23. Also in this case, as described above, the force detection operation and the touch detection operation are performed in different periods from that of the display operation, so that the displayed image can be restrained from deteriorating.

While the preferred embodiments of the present invention have been described above, the present invention is not limited to the embodiments described above. The content disclosed in the embodiments is merely an example, and can be variously modified within the scope not departing from the gist of the present invention. Any modifications appropriately made within the scope not departing from the gist of the present invention naturally belong to the technical scope of the present invention.

For example, while the touch panel 30 has been described to perform the mutual capacitance touch detection, the touch panel 30 may use the drive electrodes COML as detection electrode to perform the self-capacitance touch detection, or may use the detection electrodes TDL to perform the self-capacitance touch detection. Both the mutual capacitance touch detection and the self-capacitance touch detection may be combined together.

What is claimed is:

1. A detection device comprising:
   a substrate having a first surface and a second surface on the opposite side of the first surface;
   a common electrode that is longitudinal in a first direction in a plane parallel to the first surface of the substrate, and that is configured to be supplied with a first drive signal for detecting an object in contact with or in proximity to the first surface side of the substrate;
   a plurality of wires that face the common electrode and are arranged in the first direction, and that is configured to be supplied with a direct-current voltage signal;
   a conductor that is provided on the second surface side of the substrate, and that is configured to generate an electrostatic capacitor between the conductor and the common electrode; and
   a scanning unit configured to select some of the wires to be driven, wherein the selected wires to be driven are supplied with the direct-current voltage signal, wires not selected to be driven are placed in a floating state of not having a fixed potential, and the wires are disposed between the conductor and the common electrode in a direction vertical to the substrate; and
   a conductive wire that extends in a longitudinal direction of the common electrode and that is provided on and in direct contact with a whole length of the common electrode.

2. The detection device according to claim 1, wherein the wires not selected to be driven are supplied with a guard signal for reducing a parasitic capacitance between the common electrode and the wires.

3. The detection device according to claim 1, wherein the scanning unit is configured to select the wires a plurality of times while changing a combination between the wires selected to be driven and the wires not selected to be driven.

4. The detection device according to claim 1, further comprising:
   a first detection wire that is in contact with the common electrode, and is coupled to one end side in an extending direction of the common electrode; and
   a second detection wire that extends in the extending direction of the common electrode, and is coupled to the other end side of the common electrode, wherein
   the conductive wire is used also as the first detection wire and the second detection wire, and
   a second drive signal is configured to be supplied to the common electrode through the first detection wire and the second detection wire.

5. The detection device according to claim 4, further comprising auxiliary wire that couples the first detection wire to the second detection wire, wherein the first detection wire, the second detection wire, the auxiliary wire, and the common electrode are coupled together in a loop.

6. The display device according to claim 5, further comprising a dummy electrode extending in the longitudinal direction of the common electrode and being disposed adjacent to the common electrode in the second direction, wherein
   the auxiliary wire includes a first auxiliary wire, a second auxiliary wire, and a third auxiliary wire,
   each of the first auxiliary wire and the second auxiliary wire extends in a direction intersecting the first detection,
   the dummy electrode overlaps the third auxiliary wire that extends along the longitudinal direction of the common electrode, and
   the first detection wire, the first auxiliary wire, the third auxiliary wire, the second auxiliary wire, the second detection wire, and the common electrode are coupled in the loop.

7. The display device according to claim 5, further comprising a dummy electrode extending in the longitudinal direction of the common electrode and being disposed adjacent to the common electrode in the second direction, wherein
   the auxiliary wire includes a first auxiliary wire, a second auxiliary wire, and a third auxiliary wire,
   each of the first auxiliary wire and the second auxiliary wire extends in a direction intersecting the first detection and is disposed in a same layer with the first detection wire and,
   the dummy electrode overlaps the third auxiliary wire that extends in the longitudinal direction of the common electrode and is disposed in a layer different from the first detection wire, and
   the first detection wire, the first auxiliary wire, the third auxiliary wire, the second auxiliary wire, the second detection wire, and the common electrode are coupled in the loop.

8. The detection device according to claim 1, wherein coordinates of force of the object in contact with the first surface side of the substrate are configured to be calculated based on a change in electrostatic capacitance between the common electrode and the conductor and a change in electrostatic capacitance between the wires and the conductor.

9. The detection device according to claim 1, further comprising a detection electrode facing the common electrode, wherein coordinates of the object in contact with or in proximity to the first surface side of the substrate are configured to be calculated based on an electrostatic capacitance between the common electrode and the detection electrode.

10. A display device comprising:
    the detection device as claimed in claim 1;
    a plurality of pixel electrodes arranged in a matrix and facing the common electrode; and
    a display function layer configured to perform an image display function in a display area.

11. The display device according to claim 10, wherein at least one of the detection wire coupled to the common electrode or the auxiliary wire coupled to the detection wire serves as a signal wire to display an image on the display device.

12. The display device according to claim 10, further comprising:
    switching elements provided corresponding to the pixel electrodes; and
    scan signal lines to supply scan signals to the switching elements, wherein
    the wires serve as the scan signal lines.

13. The display device according to claim 10, further comprising:
    switching elements provided corresponding to the pixel electrodes; and
    pixel signal lines to supply pixel signals to the switching elements, wherein
    the wires serve as the pixel signal lines.

14. The display device according to claim 10, wherein a display operation of causing the display function layer to perform the image display function, a touch detection operation of detecting an external proximate object in contact with or in proximity to the first surface side of the substrate, and a force detection operation of calculating coordinates of force applied to the substrate based on a change in electrostatic capacitance between the common electrode and the conductor are configured to be performed in a time-division manner.

15. An electronic apparatus comprising:
the display device as claimed in claim 10; and
a housing incorporating the display device, wherein the housing includes the conductor.

16. An electronic apparatus comprising:
the detection device as claimed in claim 1; and
a housing incorporating the detection device, wherein the housing includes the conductor.

17. A detection device comprising:
a substrate having a first surface and a second surface on the opposite side of the first surface;
a common electrode that extends in a first direction in a plane parallel to the first surface of the substrate, and that is configured to be supplied with a first drive signal for detecting an object in contact with or in proximity to the first surface side of the substrate;
a plurality of wires that face the common electrode and are arranged in the first direction; and
a conductor that is provided on the second surface side of the substrate, and that is configured to generate an electrostatic capacitor between the conductor and the common electrode; and
a scanning unit configured to select some of the wires to be driven, wherein the selected wires to be driven are supplied with the direct-current voltage signal, wires not selected to be driven are placed in a floating state of not having a fixed potential, the wires are disposed between the conductor and the common electrode in a direction vertical to the substrate, and the wires include wires having different parasitic capacitances from one another; and
a conductive wire that extends in a longitudinal direction of the common electrode and that is provided on and in direct contact with a whole length of the common electrode.

* * * * *